United States Patent [19]
Verboom et al.

[11] Patent Number: 4,802,154
[45] Date of Patent: Jan. 31, 1989

[54] HIGH DENSITY CODES FOR OPTICAL RECORDING

[75] Inventors: Johannes J. Verboom; Christiaan Steenbergen, both of Colorado Springs, Colo.

[73] Assignee: Laser Magnetic Storage International Company, Colorado Springs, Colo.

[21] Appl. No.: 714,585

[22] Filed: Mar. 21, 1985

Related U.S. Application Data

[63] Continuation-in-part of Ser. No. 541,753, Oct. 9, 1983, abandoned, and a continuation-in-part of Ser. No. 566,922, Dec. 29, 1983, abandoned, and a continuation-in-part of Ser. No. 578,151, Feb. 8, 1984, abandoned.

[51] Int. Cl.$^4$ .......................... G11B 7/00; G11B 20/12
[52] U.S. Cl. ...................... 369/59; 369/111; 369/124; 360/40
[58] Field of Search .............. 369/59, 111, 124, 109; 360/32, 40; 346/76 L; 340/347 DD; 371/2

[56] References Cited

U.S. PATENT DOCUMENTS

| | | | |
|---|---|---|---|
| 2,552,629 | 5/1951 | Hamming et al. | 371/37 |
| 3,778,785 | 12/1973 | von Gutfeld | 365/113 |
| 3,852,687 | 12/1974 | Hodges | 340/347 SY |
| 3,868,651 | 2/1975 | Ovshinsky | 365/113 |
| 4,118,734 | 10/1978 | Bouahuis | 369/111 |
| 4,145,758 | 3/1979 | Drexler et al. | 365/20 |
| 4,150,408 | 4/1979 | Koel et al. | 360/113 |
| 4,283,785 | 8/1981 | Miyuchi | 369/116 |
| 4,308,618 | 12/1981 | Levy et al. | 375/15 |
| 4,323,931 | 4/1982 | Jacoby | 360/40 |
| 4,326,282 | 4/1982 | Verboom | 369/48 |
| 4,355,318 | 10/1982 | Miyauchi | 346/76 L |
| 4,357,634 | 11/1982 | Chung | 360/40 |
| 4,377,805 | 3/1983 | Youhill | 340/347 DD |
| 4,464,714 | 8/1984 | Huipir | 364/200 |
| 4,488,277 | 12/1984 | McFarlane et al. | 369/48 |
| 4,525,822 | 6/1985 | Nishimura | 369/44 |

FOREIGN PATENT DOCUMENTS

| | | | |
|---|---|---|---|
| 0026699 | 4/1981 | European Pat. Off. | |
| 66512 | 12/1982 | European Pat. Off. | 360/32 |
| 74656 | 3/1983 | European Pat. Off. | |
| 2358786 | 2/1978 | France | |
| 2455401 | 11/1980 | France | |

OTHER PUBLICATIONS

Check, Dennison & Dimmick, "Optical or Magnetic Delta Distance Decoding Scheme," IBM Technical Disclosure Bulletin, vol. 17, No. 4, pp. 1178–1183, (Sep. 1974).

Miessler, "Translator for Run Length Limited Code," IBM Technical Disclosure Bulletin, vol. 17, No. 5, pp. 1489–1491, (Oct. 1974).

Cohn & Jacoby, "Run–Length Reduction of 3PM Code Via Look-Ahead Technique," IEEE Transactions on Magnetics, vol. MAG-18, No. 6, pp. 1253–1255, (Nov. 1982).

*Primary Examiner*—Alan Faber
*Attorney, Agent, or Firm*—Sheridan, Ross & McIntosh

[57] ABSTRACT

A set of high density codes for optical recording of binary data. The data bits of each set are encoded into a block code having a plurality of symbols, each symbol having a plurality of symbol position with an even number of holes with the constraint that there be at least two symbol positions between holes or groups of holes. Additionally, a least one hole is never recorded at a predetermined boundary symbol position. This "empty" symbol position permits symbol position dimensions to be reduced while maintaining good read margins to provide high density recording.

29 Claims, 10 Drawing Sheets

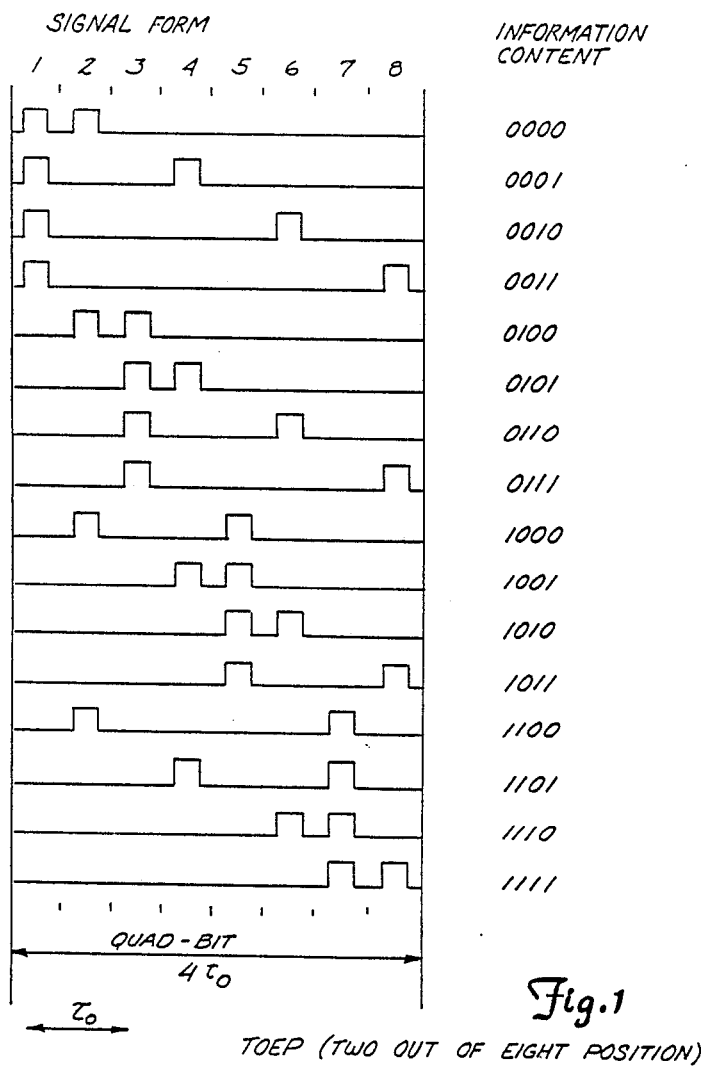
Fig.1 TOEP (TWO OUT OF EIGHT POSITION)
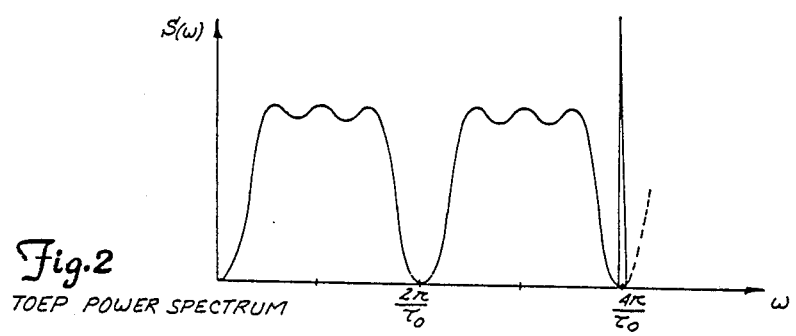
Fig.2 TOEP POWER SPECTRUM

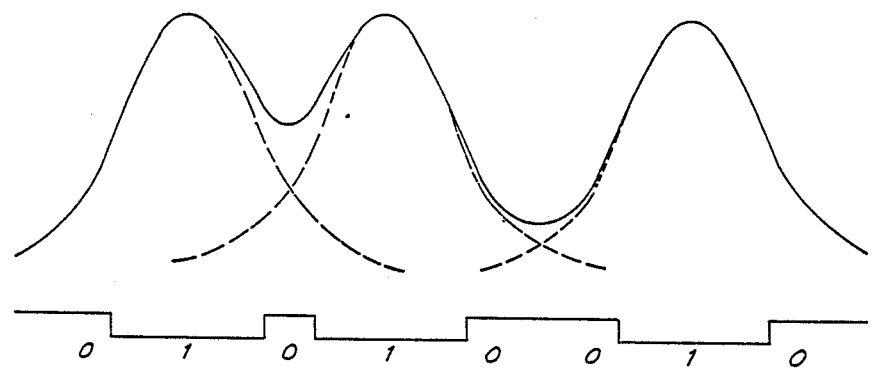
Fig.3 HOLE DIAMETER 0.9 MICRON, SPACING 0.6 MICRON
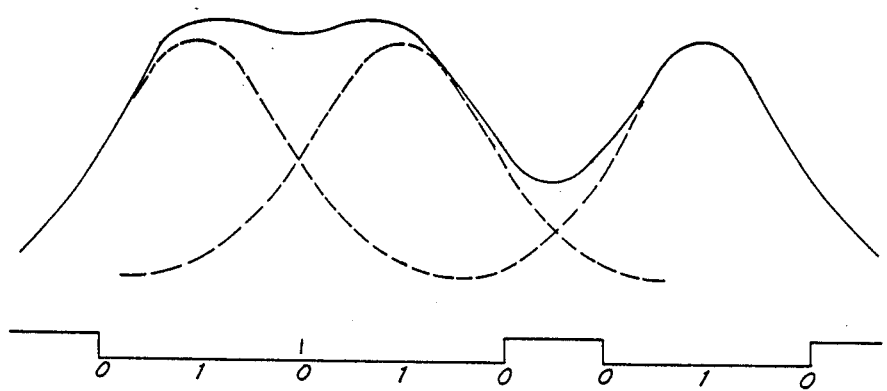
Fig.4 HOLE DIAMETER 1.25 MICRON, SPACING 0.6 MICRON
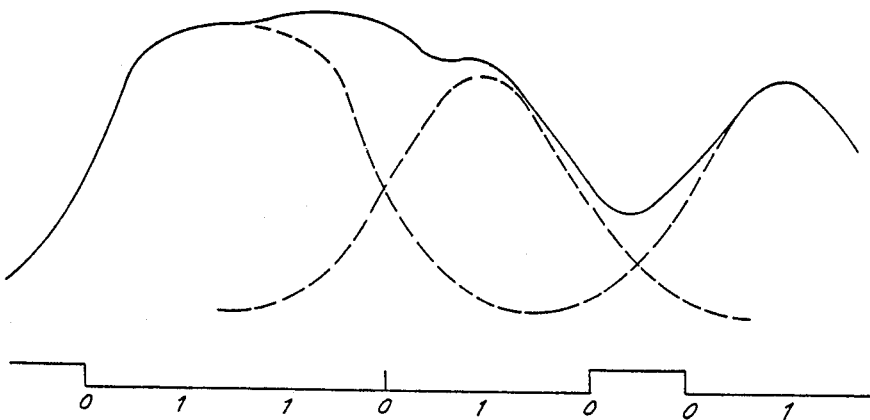
Fig.5 HOLE DIAMETER 1.25 MICRON, SPACING 0.6 MICRON

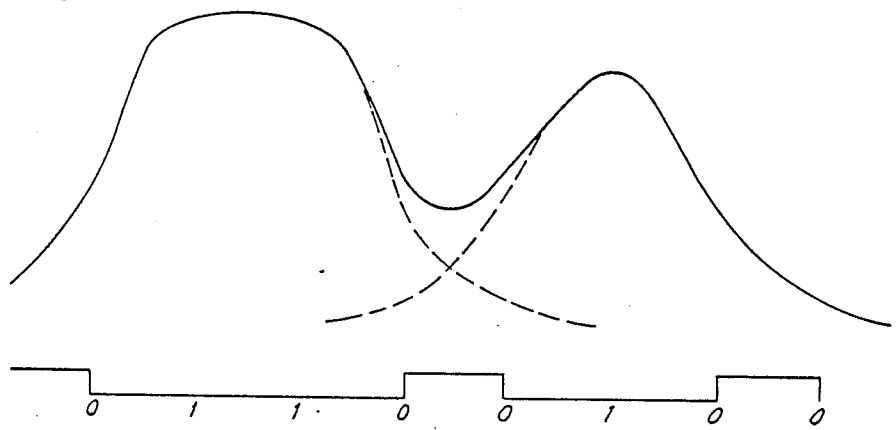
Fig. 6 HOLE DIAMETER 1.25 MICRON, SPACING 0.6 MICRON
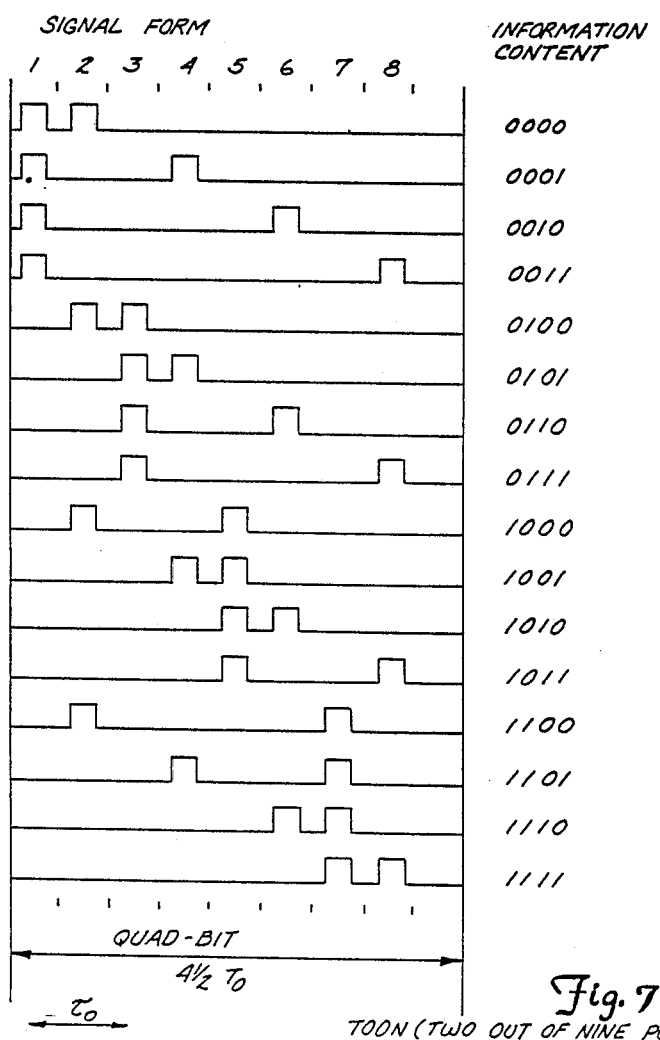
Fig. 7 TOON (TWO OUT OF NINE POSITIONS)

TOON POWER SPECTRUM

HIGH DENSITY CODES FOR OPTICAL RECORDING

This application is a continuation-in-part of the following applications: Ser. No. 541,753 filed 10/9/83, now abandoned; Ser. No. 566,922 filed 12/29/83, now abandoned; and Ser. No. 578,151 filed 2/8/84, also abandoned.

BACKGROUND OF THE INVENTION

1. Field of the Invention

The invention relates generally to the field of optical recording apparatus and more specifically to codes for recording data on the optical media.

2. Description of the Prior Art

The origins of the present invention lie in the optical recording environment, where it often is preferred to have a clock or pilot signal prerecorded on the optical media which is decoded by the optical system when the data is read. In order to decode a prerecorded pilot signal or clock the data must be recorded in such a manner that a null in the frequency spectrum is present upon reading the data. The frequency of the clock is chosen to coincide with the null.

One such code generating a null in the frequency spectrum was the so-called quadphase code. In this code two bits of binary code are encoded into a symbol. In optical recording, the two bits are encoded by writing holes corresponding to the bit pattern in the first half of a symbol and writing holes corresponding to the inversion of the bit pattern in the second half of the symbol. Thus every symbol has four symbol positions. A binary 00 would be written with two holes in symbol positions 1 and 2 and 2 spaces written in symbol positions 3 and 4. Binary pattern 01 would have a hole in symbol position 1 and a hole in symbol position 4 with no holes in positions 2 and 3. Binary 10 would have a hole in positions 2 and 3 and no holes in positions 1 and 4 and bit binary 11 would have no holes in positions 1 and 2 and holes in positions 3 and 4.

Quadphase coding produces a null in the frequency spectrum of the data at a frequency $F_o$ corresponding to ½ of the frequency of symbol positions. This frequency coincidentally is the frequency of the binary data, i.e. 4 symbol positions correspond to 2 bits of binary data.

While quadphase coding generates a null in the frequency spectrum, it was found to be inefficient with respect to laser burden: it uses one pulse per bit. An improved code was therefore developed. This code is the so-called 2/8 or two out of eight position code ("TOEP"). This code is shown in FIG. 1. This code encodes four bits of information over eight symbol positions but uses only two holes within any symbol. As with the quadphase code, it generates a null in the frequency spectrum at $2\pi/T_o$, where $T_o$ is the period of two symbol positions. FIG. 2 shows its power spectrum.

The code also is a so-called D=2 code wherein two positions are reserved between holes or groups of holes. Due to its D=2 nature, the TOEP code generates good read margins within a symbol, but due to the fact that D=2 is not maintained at symbol boundaries, the density of symbol positions was limited by the worst case boundary condition.

In order to increase the density of code, it was thought desirable to space the symbol positions so closely together that the size of a hole, that is the diameter of a hole, may be greater than one symbol position. This produced obvious problems when reading and decoding a symbol in that the signal due to a symbol "spreads" into adjacent symbol positions. This problem is magnified due to the optics of the laser read beams commonly employed in optical recording systems. These beam spots are not sharply defined beams but rather possess the form of a Gaussian curve, with half power widths about equal to the diameter of the holes produced in writing with the same spot. For holes or groups of holes, the half power width of a signal caused by the reading roughly corresponds to the diameter of the holes. Thus there will be considerable read signal power extending beyond the diameter of a hole.

These two problems, i.e. hole diameter versus symbol position spacing and read signal overlap, further combined to limit the bit density of optical recording with fixed block codes.

SUMMARY OF THE INVENTION

The invention comprises adding at least one "empty" symbol position between symbols in a D=2 or greater fixed block code. This permits reducing the spacing between symbols positions. Even though the the reduction in spacing degrades the readability of holes within a symbol, the extra "empty" symbol position at the boundary improves the readability at the boundaries. This was the location of the worst read margins in the prior codes. An overall performance gain is achieved.

Further, while there is now an extra one-half clock period per symbol, the power spectrum of the resulting codes maintain the constraint that there appear a null in the frequency spectrum.

The invention further comprises maintaining a predetermined spacing between monoholes or between monoholes and groups of holes or between groups of holes in fixed block codes. Maintaining a minimum spacing between monoholes, etc., permits symbol position spacing to be minimized relative to hole size and still permit correct decoding of the symbol. As a result, more bits may be recorded over less physical space.

As the spacing between monoholes, etc., must be a multiple of symbol positions, the invention therefore comprises that the minimum spacing be two or more symbol positions, i.e., D=2 or greater. The choice of D=2, D=3, D=4, etc., depends upon the characteristics of the particular optical recording environment. Generally, the higher the ratio of the largest expected hole diameter to symbol position size, the large "D" must be.

Within the family of codes which have a null in their frequency spectrum that permit the use of a prerecorded clock, the number of holes within a symbol must be a multiple of two, i.e., two, four, six, eight. The inventors have determined that the following pre-clock compatible codes permit the highest bit densities of eight or fewer bits in optical recording.

The first code is a 4/15 code and the second a 6/18 code. The first code essentially comprises a symbol of 15 positions having therein four holes with the following constraints: there must be at least two empty symbol positions between holes or groups of holes, the 15th position must never have a hole and patterns having four holes in a row within a symbol or three holes in a row adjacent symbol boundaries being to the extent possible, confined to the center of a symbol or reserved for special function codes infrequently used. The second code essentially comprises a symbol of 18 positions having therein 6 holes with the following constraints: there must be at least 3 empty positions between holes or groups of holes, the 17th and 18th position must never have a hole and patterns having 6 and 5 holes in a row or 4 holes in a row at the first four positions being reduced to the extent possible.

Note that here and throughout the specification and the claims, the term hole is intended to include all forms of altering the media state including the reflectivity state of the media. Other states include partially melted and chemically changed media states.

The requirement of specifying the limit on the number of holes in a row reduces the burden on the laser diodes commonly employed in optical recording systems.

BRIEF DESCRIPTION OF THE DRAWINGS

FIG. 1 shows the TOEP code and its corresponding bit information content.

FIG. 2 shows the power spectrum of the TOEP code.

FIG. 3 is a graph of the intensity of the signal detected by the read optics of an optical disk recording system vs. symbol position where the hole diameter is 0.9 microns, the symbol position size is 0.6 microns and the half power width of the light spot 0.8 microns;

FIG. 4 is a graph of the same code pattern as in FIG. 3, but with a hole diameter of 1.25 microns;

FIG. 5 is a graph similar to FIGS. 3 and 4 but with a hole pattern having two consecutive holes, a space, followed by a hole;

FIG. 6 is a graph similar to FIG. 5 but with two consecutive holes, two spaces, followed by a hole;

FIG. 7 shows the TOON code and its corresponding bit information content.

DESCRIPTION OF THE PREFERRED EMBODIMENT

Figure 8:
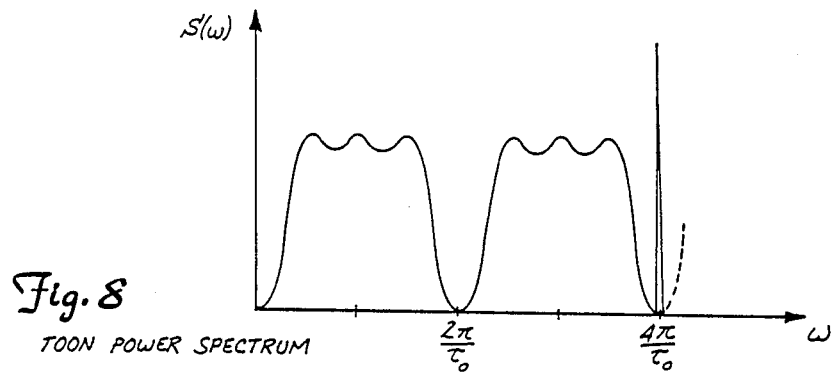
FIG. 8 shows the power spectrum of the TOON code.

In many optical recording systems coded fixed block symbols represent binary data. Certain optical recording block codes have a fixed number of holes within a symbol. In these optical recording systems, the location of the hole or holes within these symbols can be determined by comparing the signals received from each symbol position with the signals received from each of the other symbol positions and choosing the N highest signals detected to be the location of the hole or holes (N is the number of holes in a symbol, a predetermined fixed number.) For example, if a given symbol has four positions out of which two positions must contain holes, conventional optical reading apparatus compares the hole-associated signal power in each of the four positions, and chooses the two highest powered positions as being the positions where the holes are located.

The block codes of these preferred embodiments must generate a null in the frequency spectrum. Thus, the block codes must have the same number of holes in "even" and "odd" symbol positions within a symbol. Thus, in apparatus employing such a code, decoding may also be by even and odd positions, each decoded separately. However, the discussion to follows applies whichever decoding scheme is employed.

The abscissa of FIG. 3 represents the symbol pattern 01010010 written on optical media, with the ones corresponding to holes and the zeros corresponding to spaces. In this regard, the spaces are represented as elevations on the abscissa and holes are represented as depressions along the abscissa. The entire group of eight positions represent one symbol. The ordinate of FIG. 3 represents the intensity of the signals generated by the holes in conventional optical recording read optics and electronics. (If the signal is observed in reflection, the signal "caused" by a hole is actually the inversion of the power of the reflected beam. While if the signal is measured in transmission where the beam from one side of the disk is observed from the other side, the signal is a direct function of received laser power.) The dotted curves in the Figure are the intensity of the read signal associated with each of the three holes in the Figure. These curves are approximately Gaussian in shape with the half power level of the signal roughly corresponding to the diameter of the hole. In the Figure, the hole diameter is taken to be 0.9 microns while the symbol position width, or the distance between symbol centers, is taken to be 0.6 microns. The solid line in the Figure represents the summation of the signals caused by adjacent holes.

Inspection of this Figure shows that at no point does the signal generated by the holes or adjacent holes sum to a level where the peaks, generated by the holes themselves, are indistinguishable. An optical system can correctly read the symbol pattern shown in FIG. 1 because it can correctly identify the peaks associated with the holes and also determine the valleys associated with the spaces.

However, media sensitivity variations and variations in the optical recording system (light intensity, beam aberrations) will result in a distribution of hole diameters. Occasionally, holes of considerably larger diameter are written. For example, in FIG. 4, the hole diameter is now 1.25 microns. The same symbol pattern, 01010010, is represented along the abscissa as was represented in FIG. 3. Again, the dotted lines represent signal generated by the holes and the solid lines represent the summation of the signals generated by nearby holes. Inspection of the Figure shows that there is very little fall-off in signal strength between the holes of the 101 pattern. Conventional analogue comparison systems attempting to determine whether this space was a hole or a space may incorrectly decide that it was a hole and not a space. The last hole in the Figure may then be read as a space, as the comparison system will identify only three holes in a symbol, not four.

The first two Figures represent symbol patterns generated by isolated single holes, otherwise known as monoholes. FIG. 5 shows a signal pattern generated by two holes written in a row. The symbol pattern in FIG. 5 along the abscissa is a 01101001 pattern. The diameter of a hole is 1.25 microns and the symbol position distance is 0.6 microns. When two holes are written adjacent to each other, they overlap and will look like one large, long hole as illustrated in the Figure. This one large, long hole generates a signal of somewhat higher intensity than a signal generated by a signal hole, as shown in the Figure. Compare the signal generated by the group of two holes with the signals generated by the following two monoholes.

Again, in the Figure, the dotted lines represent the signal generated by the holes themselves. As before the monohole patterns are Gaussian in shape, but the signal from the double hole has Gaussian shaped edges and a flatter top. The solid lines represent the summation of the signals of nearby holes. Apparatus looking for the symbol positions with the four highest signals would incorrectly find holes at positions 2, 3, 4 and 5 and spaces at all other positions because at positions 2, 3, 4 and 5, the signal strength generated by the hole pattern 1101 at these positions is higher at all points, including the space, than the signal generated by the monohole at position 8.

Now turning to FIG. 6, the abscissa shows a symbol pattern of 01100100 and a hole diameter of 1.25 microns and a symbol position distance of 0.6 microns. The read apparatus can correctly decode the positions of the three holes because the signal due to the double hole and the signal of the following monohole do not sum at the spaces to a signal which approximately equals or exceeds the signal generated by the monohole itself, this even though the signal generated by the double hole is greater in magnitude than the signal generated by the subsequent monohole and overlaps with significant signal power three positions away.

The above process can be extended to groups of three holes in a row. However, the signal power generated by three holes in a row is not significantly greater than the signal power generated by two holes in a row. Again, referring to FIG. 6, the pattern generated by having holes in the first three positions of the illustrated symbol rather than having holes generated in only positions 2 and 3, would be similar to the illustrated pattern and the read apparatus could correctly decode the holes at positions 1, 2, 3 and 6 and spaces in positions 4 and 5.

FIGS. 3-6 have been analyzed to show that the presence of two spaces between holes and groups of holes permits correct decoding of the symbol. Similar reasoning indicates the further advantage of having 3 spaces between holes or strings of holes and at least two empty positions at symbol boundaries when the size of the hole diameter relative to the size of the symbol position increases.

The situation shown in FIG. 5 occurs only at the boundaries of a symbol in a TOEP code. In order to avoid this problem, it is conventional to maintain the size of symbol positions vis-a-vis holes large enough so that the overlap problem does not occur with any great frequency. However, this limits symbol density on the optical media and, correspondingly, bit density.

The inventors have chosen a different approach. Referring to FIG. 5, if the space between the double hole and the monohole is ignored, then no decoding problem is presented. The decoding apparatus would not decode the space as a hole and the subsequent hole as a space because it would ignore the signal level at the space.

As a result, it no longer is necessary to maintain enlarged symbol position spacing to avoid the overlap problem. Symbol position spacing may be reduced vis-a-vis a code recognizing this symbol position as possibly containing a valid hole.

In determining which code will generate the maximum bit density, it is desirable to inspect only those codes which encode a multiple of the power of two bits, that is, two bits, four bits, eight bits, sixteen bits, etc. For example, the quadphase code encodes two bits, and has four symbol positions and two holes within a symbol. A so-called two out of eight position code ("TOEP"), has eight positions in the symbol and encodes four bits of information. In general, in order to encode two bits of information in a symbol, the code must have at least 4 different hole patterns. To decode four bits in a symbol the code must have at least sixteen different hole patterns. Similarly, to encode eight bits of information, the code must have at least two hundred fifty-six different patterns.

To a certain limit, the more holes there are in a symbol, the greater the number of possible patterns that can be contained within the symbol. For example, in a four position symbol, if the code was constrained to have only one hole per symbol, there would be only four different patterns possible, that is a hole in position one, in position two, in position three or in position four. However, if the symbol could have 2 holes, the number of possible codes is now 6, i.e.

| 1100 | 1010 | 1001 | 0110 | 0101 | 0011 |
| --- | --- | --- | --- | --- | --- |

(In the quadphase code the patterns 1010 and 0101 are eliminated because they do not follow the constraint that the pattern of the first two positions be inverted in the second two positions so as to permit a null in the frequency spectrum.)

The first preferred embodiment employs the TOEP code but adds an additional symbol position wherein a hole is never recorded. Viewed alternatively, it is a TOEP with an empty position between symbols. In either case, the resulting code is denominated TOON for To Out of Nine positions. The code is shown in FIG. 7 with the leftmost chart showing the relative positions of the holes within a nine position symbol and the rightmost chart showing the corresponding bit information.

One surprising feature of the TOON code is that the power spectrum continues to have a null at $2\ddot{U}/T_o$, where $T_o$ is the period of two symbol position. The power spectrum of the TOON code is show in FIG. 8.

Figure 9:
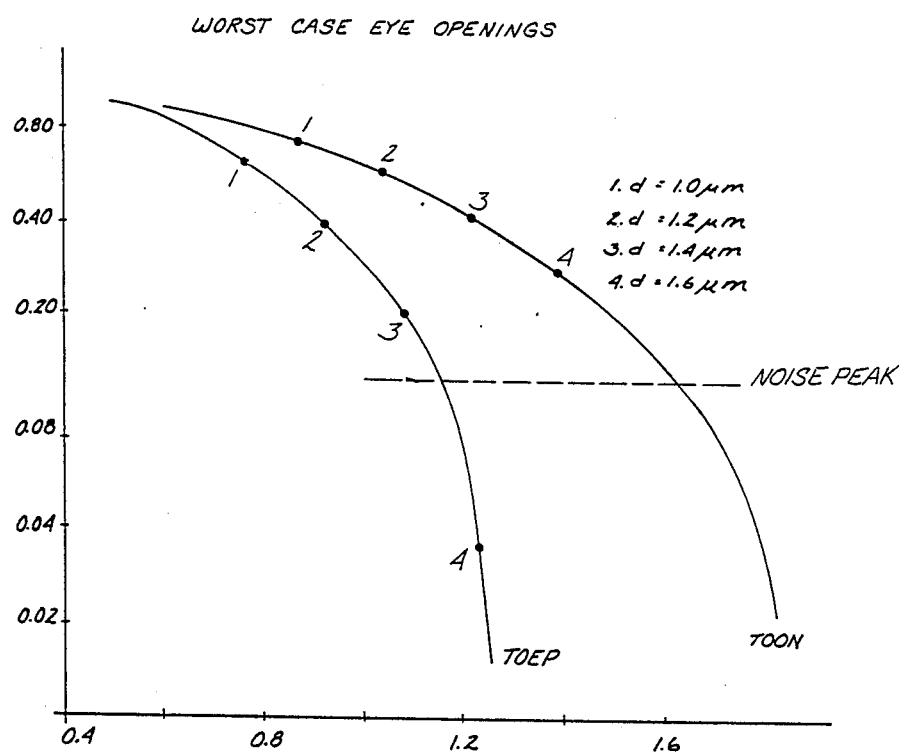
FIG. 9 is a graph of the worst case "eye" openings of the TOON and the TOEP codes. The ordinate represents fractions of the monohole amplitude and the abscissa represents the hole size parameter divided by the distance traveled during one clock period.

Adding an extra symbol position without reducing the size of the symbol positions to at least 9/8 of the size of the positions of the TOEP may result in better read performance, but it would sacrifice bit density. However, the preferred embodiment does reduce symbol position size to 9/8 the size of the TOEP and finds that overall read performance is increased with the TOON code. FIG. 9 represents these findings.

The abscissa in FIG. 9 represents hole size parameter sigma divided by the minimum symbol position spacing or distance traveled over half a clock period. For the laser spot-size used, below a hole diameter of 0.95 microns the hole size parameter's calculation depends upon the particular optics and the size of the hole. The formula for its calculation is complex and not relevant to our discussion, as well, it is known to those skilled in the art. However, for hole sizes above 0.95 microns, sigma is approximately equal to 5/7th's the hole diameter. Thus, the dimension of the abscissa is directly related to hole diameter, generally by the factor of 5/7th of the hole diameter. The dimension of the abscissa is further inversely related to symbol position spacing. As both codes are compared at a binary density of 1.85 microns per bit, the symbol position spacing varies inversely with the number of positions within a symbol. Thus, the abscissa dimension again varies directly with the number of symbol positions of a code.

The ordinate of the Figure represents the worst case "eye" opening in fractions of the signal generated in the read apparatus by a monohole. An "eye" opening can be defined as the difference between the amplitude of the signal due to a monohole and the amplitude of a summation signal due to adjacent holes measured at a space, see FIGS. 3-6. Formulae for calculating an "eye" pattern from a given code pattern, hole size, spot size, etc., are known in the art. The worst case "eye" can be derived by inspection by looking at the code patterns having the least distance between holes or groups of holes. The smaller the "eye", the higher the chance of erroneous decoding because of the inevitable noise in the system.

As mentioned above, both codes are compared at the same bit density, that is that the same number of binary bits are encoded per unit of length on the media. The standard of comparison is 1.85 microns per bit (one binary bit of information per 1.85 microns on an optical recording surface). Codes having different real lengths and position spacing may be compared meaningfully in this manner. If a two bits are encoded, the entire symbol is 3.7 microns in length ((1.8 microns/bit)×(2 bits)). If four bits are encoded, the symbol is 7.2 microns long. If eight bits are encoded, the symbol is 14.8 microns long.

The first solid line in the Figure represents the worst case "eye" opening for the TOEP code. The second solid line is the worst case "eye" opening for the TOON code. The "eye" openings were determined for four hole diameter sizes: (1) 1.0 microns, (2) 1.2 microns, (3) 1.4 microns and (5) 1.6 microns.

Inspection of the Figure shows that at every hole diameter, the TOON code generates better worst case "eye" than the TOEP code. Thus, the TOON code has better read performance, i.e., the code's worst case "eyes" lie further away from expected noise peaks, shown in the Figure as a dotted line.

Figure 10:
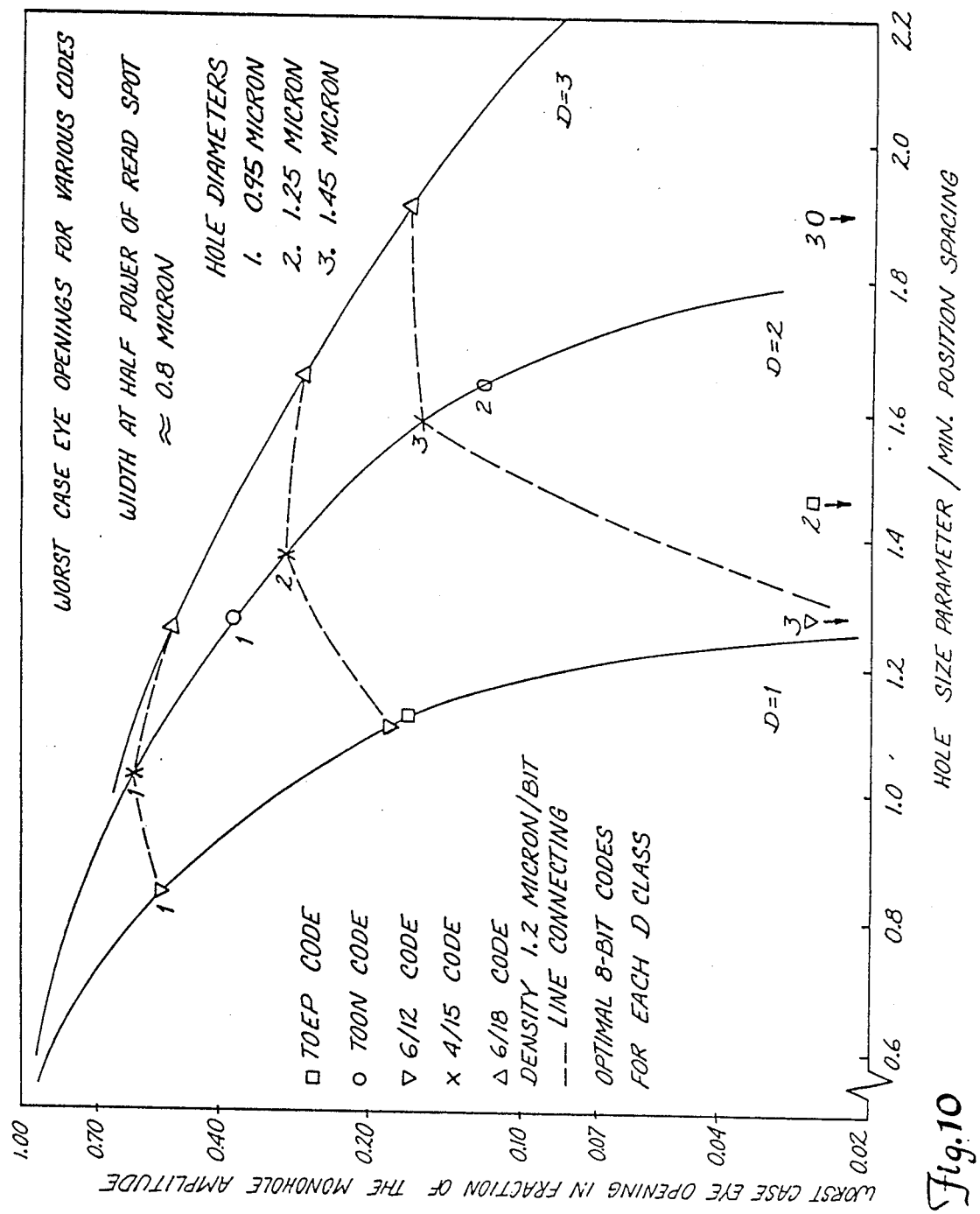
FIG. 10 is a graph of the worst case "eye" openings of several codes. The ordinate represents fractions of the monohole amplitude and the abscissa represents the hole size parameter divided by the distance traveled during one clock period.

While the TOON code represents an improvement over the TOEP code, finding the code which will optimize the number of bits encoded over a unit of space is difficult and complex. FIG. 10 represents the results of an analysis of many different codes in the TOON class. Again, the abscissa in FIG. 10 represents hole size parameter sigma divided by the minimum symbol position spacing or distance traveled over half a clock period. The dimension of the abscissa is further inversely related to symbol position spacing. As the bit densities are held constant, i.e., 1.2 microns/bit, the symbol position spacing varies inversely with the number of positions within a symbol. Thus, the abscissa dimension again varies directly with the number of symbol positions of a code.

The ordinate of the Figure represents the worst case "eye" opening in fractions of the signal generated in the read apparatus by a monohole.

The comparison methodology also included the following comparison criteria. Compared codes were to have the same bit density, that is that the same number of binary bits were to encoded per unit of length on the media. The standard example of comparison was chosen to be 1.2 microns per bit (one bit per 1.2 microns). Symbols having different real lengths and position spacing may be compared meaningfully in this manner. If a two bits are encoded, the entire symbol is 2.4 microns in length ((1.2 microns/bit)×(2 bits)). If four bits are encoded, the symbol is 4.8 microns long. If eight bits are encoded, the symbol is 9.6 microns long.

All codes shown in FIG. 10 have the same bit density, 1.2 microns oer bit. All have a null in the frequency spectrum. The first solid line in the Figure represents the worst case "eye" opening for D=1 codes, where D=1 means that there is a minimum of 1 symbol position between monoholes or between monoholes and groups of holes or between groups of holes. The second solid line is the worst case "eye" opening for D=2 codes. The third solid line is for D=3 codes. The "eye" openings were determined for three hole diameter sizes: (1) 0.95 microns, (2) 1.25 microns and (3) 1.45 microns. The codes having the best worst case "eye" patterns are listed in the Figure. The TOON code represented by a dot is a so-called 2 out of 9 code. The 2 out of 9 position code ("TOEP") is represented by a square. (Both TOON and TOEP encode four bits.) The 6 out of 12 code is represented by an upside-down delta. (The 6 out of 12 code encodes 8 bits.) The 4 out of 15 code is represented by an X. (It encodes 8 bits.) The 6 out of 18 code is represented by a delta. (It encodes 8 bits.)

Inspection of the Figure shows that for 1.2 microns/-bit density and for holes less than or equal to 1.45 microns in diameter, the 4 out of 15 code generates the best "eye", that is, its worst case "eye" opening is 0.6 of the monohole amplitude for a 0.95 micron hole diameter and 0.3 for a 1.25 micron hole diameter; while other codes for similar diameters generate worse "eyes". The 6 out of 18 code generates a better eye for holes larger than 1.45 microns. It also generates the best "eye" at a higher bit density for smaller holes.

FIG. 10 illustrates that in most situations the best worst case "eye" for a given bit density is achieved by the 4 out of 15 code. In some cases, the 6 out of 18 code may be preferred although it poses a heavier burden on the laser. Applicants' codes may achieve the highest binary bit density in optical recording or 8-bits preclock compatible block codes.

The 4 out of 15 code has its 15th symbol position constrained always to have no hole. It is also constrained to generate a null in the frequency spectrum so as to permit a preclock system by using an equal number of holes on odd and even positions, respectively. These constraints combine to leave remaining 441 different possible patterns. Out of these 441 different possible patterns, a certain number must be eliminated as only 256 are encoded. The first ones eliminated are the ones not satisfying a D=2 constraint, i.e., the ones not having at least two spaces between monoholes or between monoholes and groups of holes or between groups of holes. The ones eliminated next are the patterns which place the highest burden on the laser diodes of conventional optical recording devices. Laser diodes in most optical recording devices should not be pulsed at write power for a significant amount of time. The last constraint eliminates patterns having three holes in a row near symbol boundaries and all patterns having four holes in a row.

The specific set of 256 patterns deemed by the inventor to generate this optimal bit code for laser diode optical recording are listed in Table 1.

TABLE 1

4/15 (d = 2) Code, Pre-Clock Compatible

| | 1 | 2 | 3 | 4 | 5 | 6 | 7 | 8 | 9 | 10 | a | b | c | d | e |
|---|---|---|---|---|---|---|---|---|---|---|---|---|---|---|---|
| 0 | X | | | X | X | X | | | | | | | | | |
| 1 | | X | | | | | | | | | X | X | X | | |
| 2 | | | X | | | X | X | X | | | | | | | |
| 3 | X | X | | | X | X | | | | | | | | | |
| 4 | X | X | | | | X | X | | | | | | | | |
| 5 | X | X | | | | X | | | X | | | | | | |
| 6 | X | X | | | | X | | | | | X | | | | |
| 7 | X | X | | | | X | | | | | | | X | | |
| 8 | | X | X | X | | X | X | | | | | | | | |
| 9 | | X | X | X | | X | | | X | | | | | | |
| 10 | | X | X | X | | X | | | | | X | | | | |
| 11 | | X | X | X | | X | | | | | | | X | | |
| 12 | | X | | | X | X | X | | | | | | | | |
| 13 | | X | | | X | X | | | X | | | | | | |
| 14 | | X | | | X | X | | | | | X | | | | |
| 15 | | X | | | X | X | | | | | | | X | | |
| 16 | | X | | | | X | X | | | | X | | | | |
| 17 | | X | | | | X | X | | | | | | X | | |
| 18 | | | | X | | X | X | X | | | | | | | |
| 19 | X | X | | | X | | X | X | | | | | | | |
| 20 | X | X | | | | | | X | X | | | | | | |
| 21 | X | X | | | | | | X | X | X | | | | | |
| 22 | X | X | | | | | | X | X | | X | | | | |
| 23 | X | X | | | | | | X | X | | | | X | | |
| 24 | | X | X | | | | X | X | | | | | | | |
| 25 | | X | X | X | | | | X | X | | | | | | |
| 26 | | X | X | X | | | | X | | | X | | | | |
| 27 | | X | X | X | | | | X | | | | | X | | |
| 28 | | X | | | X | | X | X | | | | | | | |
| 29 | | X | | | X | | | X | X | | | | | | |
| 30 | | X | | | X | | | X | | | X | | | | |
| 31 | | X | | | | | X | X | X | | | | | | |
| 32 | | X | | | | | | X | X | | X | | | | |
| 33 | | X | | | | | X | X | | | | | X | | |
| 34 | | X | | | | | | X | X | X | | | | X | |
| 35 | | | | | X | | | X | X | X | | | | | |
| 36 | X | X | | | X | | | | | X | | | | | |
| 37 | X | X | | | | | X | | | X | | | | | |
| 38 | X | X | | | | | | | X | X | | | | | |
| 39 | X | X | | | | | | | | X | X | | | | |
| 40 | X | X | | | | | | | | X | | | X | | |
| 41 | | X | X | | | | X | | | X | | | | | |
| 42 | | X | X | X | | | | | X | X | | | | | |
| 43 | | X | X | X | | | | | | X | X | | | | |
| 44 | | X | X | X | | | | | | X | | | X | | |
| 45 | | X | | | X | | | | X | X | | | | | |
| 46 | | X | | | X | | | | | X | X | | | | |
| 47 | | X | | | X | | | | | X | | | X | | |
| 48 | | X | | | | | X | | X | X | | | | | |
| 49 | | X | | | | | X | | | X | | | X | | |
| 50 | | X | | | | | | X | X | X | | | | | |
| 51 | | X | | | | | | X | X | X | | | X | | |
| 52 | | | | | X | | | X | X | X | | | | | |
| 53 | X | X | | | X | | | | | | | X | | | |
| 54 | X | X | | | | | X | | | | | X | | | |
| 55 | X | X | | | | | | | X | | | X | | | |
| 56 | X | X | | | | | | | | | X | X | | | |
| 57 | X | X | | | | | | | | | | X | X | | |
| 58 | | X | X | | | | X | | | | | X | | | |
| 59 | | X | X | X | | | | | X | | | X | | | |
| 60 | | X | X | X | | | | | | | X | X | | | |
| 61 | | X | X | X | | | | | | | | X | X | | |
| 62 | | X | | | X | | | | X | | | X | | | |
| 63 | | X | | | X | | | | | | X | X | | | |
| 64 | | X | | | X | | | | | | | X | X | | |
| 65 | | X | | | | | X | | | | X | X | | | |
| 66 | | X | | | | | X | | | | | X | X | | |
| 67 | | X | | | | | | X | | | | X | X | | |
| 68 | | | | | | | X | | X | X | X | | | | |
| 69 | | | X | X | X | | X | | | | | | | | |
| 70 | X | X | | | X | | | | | | | | | X | |
| 71 | X | X | | | | | X | | | | | | | X | |
| 72 | X | X | | | | | | | X | | | | | X | |
| 73 | X | X | | | | | | | | X | | | | X | |
| 74 | X | X | | | | | | | | | | X | | X | |
| 75 | | X | X | | | | X | | | | | | | X | |

TABLE 1-continued

4/15 (d = 2) Code, Pre-Clock Compatible

| | 1 | 2 | 3 | 4 | 5 | 6 | 7 | 8 | 9 | 10 | a | b | c | d | e |
|---|---|---|---|---|---|---|---|---|---|---|---|---|---|---|---|
| 76 | | X | X | | | | | | X | | | | | X | |
| 77 | | X | X | | | | | | | X | | | | X | |
| 78 | | X | X | | | | | | | | | | X | X | |
| 79 | | X | | | X | | | | X | | | | | X | |
| 80 | | X | | | X | | | | | X | | | | X | |
| 81 | | X | | | X | | | | | | | | X | X | |
| 82 | | X | | | | | X | | | X | | | | X | |
| 83 | | X | | | | | X | | | | | | X | X | |
| 84 | | X | | | | | | | X | | | | X | X | |
| 85 | | | | X | X | X | | | | X | | | | | |
| 86 | | | | X | X | X | | | | | | | X | | |
| 87 | X | | | X | X | | | X | | | | | | | |
| 88 | X | | | X | | | X | X | | | | | | | |
| 89 | X | | | X | | | | X | X | | | | | | |
| 90 | X | | | X | | | | X | | X | | | | | |
| 91 | X | | | X | | | | X | | | | | X | | |
| 92 | | | X | X | | | X | X | | | | | | | |
| 93 | | | X | X | | | | X | X | | | | | | |
| 94 | | | X | X | | | | X | | X | | | | | |
| 95 | | | X | X | | | | X | | | | | X | | |
| 96 | | | | X | X | | | X | X | | | | | | |
| 97 | | | | X | X | | | X | | X | | | | | |
| 98 | | | | X | X | | | X | | | | | X | | |
| 99 | | | | X | | | X | X | | X | | | | | |
| 100 | | | | X | | | X | X | | | | | | X | |
| 101 | | | | X | | | X | X | | | | | | X | |
| 102 | X | | | X | X | | | | | X | | | | | |
| 103 | X | | | X | | | X | | | X | | | | | |
| 104 | X | | | X | | | | | X | X | | | | | |
| 105 | X | | | X | | | | | | X | X | | | | |
| 106 | X | | | X | | | | | | X | | | X | | |
| 107 | | | X | X | X | | | | | X | | | | | |
| 108 | | | X | X | | | X | | | X | | | | | |
| 109 | | | X | X | | | | | X | X | | | | | |
| 110 | | | X | X | | | | | | X | X | | | | |
| 111 | | | X | X | | | | | | X | | | X | | |
| 112 | | | | X | X | | | | X | X | | | | | |
| 113 | | | | X | X | | | | | X | X | | | | |
| 114 | | | | X | X | | | | | X | | | X | | |
| 115 | | | | X | | | X | | | X | X | | | | |
| 116 | | | | X | | | X | | | X | | | X | | |
| 117 | | | | X | | | | | X | X | X | | | | |
| 118 | | | | X | | | | | X | X | | | X | | |
| 119 | X | | | X | X | | | | | | | X | | | |
| 120 | X | | | X | | | X | | | | | X | | | |
| 121 | X | | | X | | | | | X | | | X | | | |
| 122 | X | | | X | | | | | | X | | X | | | |
| 123 | X | | | X | | | | | | | | X | X | | |
| 124 | | | X | X | X | | | | | | | X | | | |
| 125 | | | X | X | | | X | | | | | X | | | |
| 126 | | | X | X | | | | | X | | | X | | | |
| 127 | | | X | X | | | | | | X | | X | | | |
| 128 | | | X | X | | | | | | | | X | X | | |
| 129 | | | | X | X | | | | X | | | X | | | |
| 130 | | | | X | X | | | | | X | | X | | | |
| 131 | | | | X | X | | | | | | | X | X | | |
| 132 | | | | X | | | X | | | X | | X | | | |
| 133 | | | | X | | | X | | | | | X | X | | |
| 134 | | | | X | | | | | X | | | X | X | | |
| 135 | | | | X | X | X | | | X | | | | | | |
| 136 | X | | | X | X | | | | | | | | | X | |
| 137 | X | | | X | | | X | | | | | | | X | |
| 138 | X | | | X | | | | | X | | | | | X | |
| 139 | X | | | X | | | | | | X | | | | X | |
| 140 | X | | | X | | | | | | | | | X | X | |
| 141 | | | X | X | X | | | | | | | | | X | |
| 142 | | | X | X | | | X | | | | | | | X | |
| 143 | | | X | X | | | | | X | | | | | X | |
| 144 | | | X | X | | | | | | X | | | | X | |
| 145 | | | X | X | | | | | | | | | X | X | |
| 146 | | | | X | X | | | | X | | | | | X | |
| 147 | | | | X | X | | | | | X | | | | X | |
| 148 | | | | X | X | | | | | | | | X | X | |
| 149 | | | | X | | | X | | | X | | | | X | |
| 150 | | | | X | | | X | | | | | | X | X | |
| 151 | | | | X | | | | | X | | | | X | X | |
| 152 | X | | | | | X | X | X | | | | | | | |
| 153 | | | | | | X | X | X | | | | | X | | |
| 154 | X | | | | X | X | | | | X | | | | | |
| 155 | X | | | | X | X | | | | X | | | | | |

TABLE 1-continued

| | 4/15 (d = 2) Code, Pre-Clock Compatible | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | a | b | c | d | e |
| 156 | X | | | | | X | | | X | X | | | | | |
| 157 | X | | | | | X | | | | X | X | | | | |
| 158 | X | | | | | X | | | | X | | | X | | |
| 159 | | | X | | | X | X | | | X | | | | | |
| 160 | | | X | | | X | | | X | X | | | | | |
| 161 | | | X | | | X | | | | X | X | | | | |
| 162 | | | X | | | X | | | | X | | | X | | |
| 163 | | | | | X | X | | | X | X | | | | | |
| 164 | | | | | X | X | | | | X | X | | | | |
| 165 | | | | | X | X | | | | X | | | X | | |
| 166 | | | | | | X | X | | | X | X | | | | |
| 167 | | | | | | X | X | | | X | | | X | | |
| 168 | | | | | | X | | | X | X | | | X | | |
| 169 | X | | | | X | X | | | | | | X | | | |
| 170 | X | | | | | X | X | | | | | X | | | |
| 171 | X | | | | | X | | | X | | | X | | | |
| 172 | X | | | | | X | | | | | X | X | | | |
| 173 | X | | | | | X | | | | | | X | X | | |
| 174 | | | X | | | X | X | | | | | X | | | |
| 175 | | | X | | | X | | | X | | | X | | | |
| 176 | | | X | | | X | | | | | X | X | | | |
| 177 | | | X | | | X | | | | | | X | X | | |
| 178 | | | | | X | X | X | | | | | X | | | |
| 179 | | | | | X | X | | | X | | | X | | | |
| 180 | | | | | X | X | | | | | X | X | | | |
| 181 | | | | | X | X | | | | | | X | X | | |
| 182 | | | | | | X | X | | | | X | X | | | |
| 183 | | | | | | X | X | | | | | X | X | | |
| 184 | | | | | | X | | | X | | | X | X | | |
| 185 | | | | | X | X | X | | | X | | | | | |
| 186 | X | | | | X | X | | | | | | | | X | |
| 187 | X | | | | | X | X | | | | | | | X | |
| 188 | X | | | | | X | | | X | | | | | X | |
| 189 | X | | | | | X | | | | | X | | | X | |
| 190 | X | | | | | X | | | | | | | X | X | |
| 191 | | | X | | | X | X | | | | | | | X | |
| 192 | | | X | | | X | | | X | | | | | X | |
| 193 | | | X | | | X | | | | | X | | | X | |
| 194 | | | X | | | X | | | | | | | X | X | |
| 195 | | | | | X | X | X | | | | | | | X | |
| 196 | | | | | X | X | | | X | | | | | X | |
| 197 | | | | | X | X | | | | | X | | | X | |
| 198 | | | | | X | X | | | | | | | X | X | |
| 199 | | | | | | X | X | | | | X | | | X | |
| 200 | | | | | | X | X | | | | | | X | X | |
| 201 | | | | | | X | | | X | | | | X | X | |
| 202 | X | | | | | | | X | X | X | | | | | |
| 203 | | | X | | | | | X | X | X | | | | | |
| 204 | X | | | | X | | | X | | | | X | | | |
| 205 | X | | | | | | X | X | | | | X | | | |
| 206 | X | | | | | | | X | X | | | X | | | |
| 207 | X | | | | | | | X | | | X | X | | | |
| 208 | X | | | | | | | X | | | | X | X | | |
| 209 | | | X | | | | X | X | | | | X | | | |
| 210 | | | X | | | | | X | X | | | X | | | |
| 211 | | | X | | | | | X | | | X | X | | | |
| 212 | | | X | | | | | X | | | | X | X | | |
| 213 | | | | | X | | X | X | | | | X | | | |
| 214 | | | | | X | | | X | X | | | X | | | |
| 215 | | | | | X | | | X | | | | X | X | | |
| 216 | | | | | | | X | X | | | X | X | | | |
| 217 | | | | | | | X | X | | | | X | X | | |
| 218 | | | | | | | | X | X | | | X | X | | |
| 219 | X | | | | X | | | X | | | | | | X | |
| 220 | X | | | | | | X | X | | | | | | X | |
| 221 | X | | | | | | | X | X | | | | | X | |
| 222 | X | | | | | | | X | | | X | | | X | |
| 223 | X | | | | | | | X | | | | | X | X | |
| 224 | | | X | | | | X | X | | | | | | X | |
| 225 | | | X | | | | | X | X | | | | | X | |
| 226 | | | X | | | | | X | | | X | | | X | |
| 227 | | | X | | | | | X | | | | | X | X | |
| 228 | | | | | X | | X | X | | | | | | X | |
| 229 | | | | | X | | | X | X | | | | | X | |
| 230 | | | | | X | | | X | | | | | X | X | |
| 231 | | | | | | X | X | X | | | | | | X | |
| 232 | | | | | | X | | X | X | | | | | X | |
| 233 | | | | | | X | | X | | | | | X | X | |
| 234 | | | | | | | | X | X | | | | X | X | |
| 235 | X | | | | | | | | | X | X | X | | | |

TABLE 1-continued

4/15 (d = 2) Code, Pre-Clock Compatible

| | 1 | 2 | 3 | 4 | 5 | 6 | 7 | 8 | 9 | 10 | a | b | c | d | e |
|---|---|---|---|---|---|---|---|---|---|---|---|---|---|---|---|
| 236 | | | X | | | | | | | X | X | X | | | |
| 237 | | | | X | | | | | | X | X | X | | | |
| 238 | X | | | X | | | | | | X | | | | X | |
| 239 | X | | | | | X | | | | X | | | | X | |
| 240 | X | | | | | | | X | | X | | | | X | |
| 241 | X | | | | | | | | | X | X | | | X | |
| 242 | X | | | | | | | | | X | | | X | X | |
| 243 | | | X | | | X | | | | X | | | | X | |
| 244 | | | X | | | | | X | | X | | | | X | |
| 245 | | | X | | | | | | | X | X | | | X | |
| 246 | | | X | | | | | | | X | | | X | X | |
| 247 | | | | | X | | | X | | X | | | | X | |
| 248 | | | | | X | | | | | X | X | | | X | |
| 249 | | | | | X | | | | | X | | | X | X | |
| 250 | | | | | | | X | | | X | X | | | X | |
| 251 | | | | | | | X | | | X | | | X | X | |
| 252 | | | | | | | | | X | X | | | X | X | |
| 253 | | | | | X | X | X | | | X | | | | | |
| 254 | | | | | | X | X | X | | | | X | | | |
| 255 | | | | | | | X | X | X | | | X | | | |

The 6 out of 18 code has its 17th and 18th position constrained always to have no hole. It is also constrained to generate a null in the frequency spectrum. These constraints combine to leave remaining 3136 different possible patterns. Out of these patterns, the ones not satisfying the D=3 constraints were eliminated, leaving 316 patterns. Secondly, patterns with 6 and 5 holes in a row and with 4 holes in the first 4 positions were eliminated leaving the 256 needed patterns listed in Table 2. (Due to limitation on the axis of the page, only 16 out of the 18 symbol positions are shown. The last two positions always have no holes.)

TABLE 2

6/18 (d = 3) Code, Pre-Clock Compatible

| | 1 | 2 | 3 | 4 | 5 | 6 | 7 | 8 | 9 | 10 | a | b | c | d | e | f |
|---|---|---|---|---|---|---|---|---|---|---|---|---|---|---|---|---|
| 0 | X | X | X | | | | X | X | | | | X | | | | |
| 1 | X | X | X | | | | X | X | | | | | X | | | |
| 2 | X | X | X | | | | X | X | | | | | | | | X |
| 3 | X | X | X | | | | X | | | | | X | | | | X |
| 4 | X | X | X | | | | X | X | X | | | | | | | |
| 5 | X | X | X | | | | X | X | | | | | X | | | |
| 6 | X | X | X | | | | X | X | | | | | | | | X |
| 7 | X | X | X | | | | X | | | | X | X | | | | |
| 8 | X | X | X | | | | X | | | | | X | X | | | |
| 9 | X | X | X | | | | X | | | | | | X | X | | |
| 10 | X | X | X | | | | X | | | | | | | X | X | |
| 11 | X | X | X | | | | | X | X | | | | X | | | |
| 12 | X | X | X | | | | | X | X | | | | | | | X |
| 13 | X | X | X | | | | | X | X | X | | | | | | |
| 14 | X | X | X | | | | | X | X | | | | | | | X |
| 15 | X | X | X | | | | | X | | | | | X | X | | |
| 16 | X | X | X | | | | | X | | | | | | X | X | |
| 17 | X | X | X | | | | | | | X | X | X | | | | |
| 18 | X | X | X | | | | | | | | | | X | X | X | |
| 19 | X | X | | | | X | X | X | X | | | | | | | |
| 20 | X | X | | | | X | X | X | | | | X | | | | |
| 21 | X | X | | | | X | X | X | | | | | | X | | |
| 22 | X | X | | | | X | X | | | X | X | | | | | |
| 23 | X | X | | | | X | X | | | X | | | | | | X |
| 24 | X | X | | | | X | X | | | | X | X | | | | |
| 25 | X | X | | | | X | X | | | | | X | X | | | |
| 26 | X | X | | | | X | X | | | | | | X | X | | |
| 27 | X | X | | | | X | X | | | | | | | X | X | |
| 28 | X | X | | | | X | | | | X | X | | | X | | |
| 29 | X | X | | | | X | | | | X | X | X | | | | |
| 30 | X | X | | | | X | | | | X | | | | X | X | |
| 31 | X | X | | | | X | | | | | | | X | X | X | |
| 32 | X | X | | | | | X | X | X | X | | | | | | |
| 33 | X | X | | | | | X | X | X | | | | X | | | |
| 34 | X | X | | | | | X | X | X | | | | | | | X |
| 35 | X | X | | | | | X | X | | | X | X | | | | |
| 36 | X | X | | | | | X | X | | | | X | X | | | |
| 37 | X | X | | | | | X | X | | | | | X | X | | |
| 38 | X | X | | | | | X | X | | | | | | X | X | |
| 39 | X | X | | | | | X | | | X | X | | | | | |
| 40 | X | X | | | | | X | | | | X | X | X | | | |
| 41 | X | X | | | | | X | | | | | | X | X | X | |
| 42 | X | X | | | | | | X | X | X | X | | | | | |
| 43 | X | X | | | | | | X | X | X | | | | X | | |
| 44 | X | X | | | | | | X | X | | | | X | X | | |

TABLE 2-continued

6/18 (d = 3) Code, Pre-Clock Compatible

| | 1 | 2 | 3 | 4 | 5 | 6 | 7 | 8 | 9 | 10 | a | b | c | d | e | f |
|---|---|---|---|---|---|---|---|---|---|---|---|---|---|---|---|---|
| 45 | X | X | | | | | | X | X | | | | | X | X | |
| 46 | X | X | | | | | | X | X | | | | | | X | X |
| 47 | X | X | | | | | | X | | | | | X | X | X | |
| 48 | X | X | | | | | | | X | X | X | | | | | |
| 49 | X | X | | | | | | | X | X | | | | | | X |
| 50 | X | X | | | | | | | X | X | | | | X | X | |
| 51 | X | X | | | | | | | X | X | | | | | X | X |
| 52 | X | X | | | | | | | X | | | | | X | X | X |
| 53 | X | X | | | | | | | | X | X | X | X | | | |
| 54 | X | X | | | | | | | | X | X | | | | X | X |
| 55 | X | X | | | | | | | | | X | X | X | X | | |
| 56 | X | X | | | | | | | | | | X | X | X | X | |
| 57 | X | X | | | | | | | | | | | X | X | X | X |
| 58 | X | | | | X | X | X | X | | | | | | X | | |
| 59 | X | | | | X | X | X | X | | | | | | X | | |
| 60 | X | | | | X | X | X | | | | | | | | | X |
| 61 | X | | | | X | X | X | | | | X | | | | | X |
| 62 | X | | | | X | X | | | X | X | X | | | | | |
| 63 | X | | | | X | X | | | X | X | | | | | | X |
| 64 | X | | | | X | X | | | X | | | | | | X | X |
| 65 | X | | | | X | X | | | | X | X | | | | | X |
| 66 | X | | | | X | X | | | | | X | | X | X | | |
| 67 | X | | | | X | X | | | | | | | | X | X | X |
| 68 | X | | | | X | | | | X | X | X | | | X | | X |
| 69 | X | | | | X | | | | X | | | | | X | X | X |
| 70 | X | | | | | X | X | X | X | | | | | X | | |
| 71 | X | | | | | X | X | X | X | | | | | | | X |
| 72 | X | | | | | X | X | X | | | | X | X | | | |
| 73 | X | | | | | X | X | X | | | | X | X | | | |
| 74 | X | | | | | X | X | X | | | X | X | | | X | X |
| 75 | X | | | | | X | X | X | | | | | | | X | X |
| 76 | X | | | | | X | X | | | | X | X | | | | X |
| 77 | X | | | | | X | X | | | | | X | X | X | | |
| 78 | X | | | | | X | X | | | | | | | X | X | X |
| 79 | X | | | | | X | | | X | X | X | X | | | | |
| 80 | X | | | | | X | | | X | X | | | | | X | |
| 81 | X | | | | | X | | | | X | X | X | X | | | |
| 82 | X | | | | | X | | | | | X | X | X | X | | |
| 83 | X | | | | | X | | | | | | X | X | X | | X |
| 84 | X | | | | | | X | X | X | X | | | | X | | |
| 85 | X | | | | | | X | X | X | X | | | | | | X |
| 86 | X | | | | | | X | X | | | | X | X | X | | |
| 87 | X | | | | | | X | X | | | | | X | X | | X |
| 88 | X | | | | | | X | X | X | X | | | | | X | X |
| 89 | X | | | | | | X | X | X | | | | | X | X | |
| 90 | X | | | | | | X | X | X | | | | | | X | X |
| 91 | X | | | | | | X | X | | | | | | X | X | X |
| 92 | X | | | | | | X | | | | | X | X | X | X | |
| 93 | X | | | | | | X | | | | | | X | X | X | X |
| 94 | X | | | | | | | X | X | X | | | | | X | X |
| 95 | X | | | | | | | X | X | | | | | X | X | X |
| 96 | | X | X | X | X | | | X | X | | | | | | | |
| 97 | | X | X | X | X | | | X | | | | | | X | | |
| 98 | | X | X | X | X | | | X | | | | | | | | X |
| 99 | | X | X | X | X | | | | X | X | | | | | | |
| 100 | | X | X | X | X | | | | X | | | | | X | | |
| 101 | | X | X | X | X | | | | | X | X | | | | | |
| 102 | | X | X | X | X | | | | | X | | | | | | X |
| 103 | | X | X | X | X | | | | | | X | X | | | | |
| 104 | | X | X | X | X | | | | | | | X | X | | | |
| 105 | | X | X | X | X | | | | | | | | X | X | | |
| 106 | | X | X | X | X | | | | | | | | | X | X | |
| 107 | | X | X | X | | | | X | X | | | | X | | | |
| 108 | | X | X | X | | | | X | X | | | | | X | | |
| 109 | | X | X | X | | | | | X | X | X | | | | | |
| 110 | | X | X | X | | | | | X | X | | | | X | | |
| 111 | | X | X | X | | | | | X | | | | X | X | | |
| 112 | | X | X | X | | | | | X | | | | | X | X | |
| 113 | | X | X | X | | | | | X | | | | | | X | X |
| 114 | | X | X | X | | | | | | X | X | | | | | |
| 115 | | X | X | X | | | | | | X | X | X | | | | |
| 116 | | X | X | X | | | | | | X | | | | | X | X |
| 117 | | X | X | X | | | | | | | | | X | X | X | |
| 118 | | X | X | | | X | X | X | X | | | | | X | | |
| 119 | | X | X | | | X | X | X | | | | | | X | | |
| 120 | | X | X | | | X | X | X | | | | | | | | X |
| 121 | | X | X | | | X | X | | | | X | X | | | | |
| 122 | | X | X | | | X | X | | | | | X | X | | | |
| 123 | | X | X | | | X | X | | | | | | X | X | | |
| 124 | | X | X | | | X | X | | | | | | | X | X | |

TABLE 2-continued

| | 6/18 (d = 3) Code, Pre-Clock Compatible | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | a | b | c | d | e | f |
| 125 | | X | X | | | | X | | | | X | X | | | | |
| 126 | | X | X | | | | X | | | | | X | X | X | | |
| 127 | | X | X | | | | X | | | | | | | X | X | X |
| 128 | | X | X | | | | | X | X | X | X | | | | | |
| 129 | | X | X | | | | | X | X | X | | | | | X | |
| 130 | | X | X | | | | | X | X | | | | X | X | | |
| 131 | | X | X | | | | | X | X | | | | | X | X | |
| 132 | | X | X | | | | | X | X | | | | | | X | X |
| 133 | | X | X | | | | | X | | | | | X | X | X | |
| 134 | | X | X | | | | | | X | X | X | X | | | | |
| 135 | | X | X | | | | | | X | X | X | | | | | X |
| 136 | | X | X | | | | | | X | X | | | | X | X | |
| 137 | | X | X | | | | | | X | X | | | | | X | X |
| 138 | | X | X | | | | | | X | | | | | X | X | X |
| 139 | | X | X | | | | | | | X | X | X | X | | | |
| 140 | | X | X | | | | | | | X | X | | | | X | X |
| 141 | | X | X | | | | | | | | X | X | X | X | | |
| 142 | | X | X | | | | | | | | | X | X | X | X | |
| 143 | | X | X | | | | | | | | | | X | X | X | X |
| 144 | | X | | | | X | X | X | X | | | | X | | | |
| 145 | | X | | | | X | X | X | X | | | | | | X | |
| 146 | | X | | | | X | X | | | | X | X | X | | | |
| 147 | | X | | | | X | X | | | | | X | | | X | X |
| 148 | | X | | | | X | X | | | | | | X | X | X | |
| 149 | | X | | | | | | X | X | X | X | | | | X | |
| 150 | | X | | | | | | X | X | X | | | X | X | | |
| 151 | | X | | | | | | X | X | X | | | | X | X | |
| 152 | | X | | | | | | X | X | X | | | | | X | X |
| 153 | | X | | | | | | X | X | | | | X | X | X | |
| 154 | | X | | | | | | X | | | X | X | X | X | | |
| 155 | | X | | | | | | X | | | | X | X | X | X | |
| 156 | | X | | | | | | X | | | | | X | X | X | X |
| 157 | | X | | | | | | | X | X | X | X | | X | X | |
| 158 | | X | | | | | | | X | X | | | | X | X | X |
| 159 | | X | | | | | | | | X | X | X | | | X | X |
| 160 | | X | | | | | | | | X | | | X | X | X | X |
| 161 | | | X | X | X | X | | | | X | X | | | | | |
| 162 | | | X | X | X | X | | | | X | | | | X | | |
| 163 | | | X | X | X | X | | | | | X | X | | | | |
| 164 | | | X | X | X | X | | | | | X | | | | | X |
| 165 | | | X | X | X | X | | | | | | X | X | | | |
| 166 | | | X | X | X | X | | | | | | | X | X | | |
| 167 | | | X | X | X | X | | | | | | | | X | X | |
| 168 | | | X | X | X | X | | | | | | | | | X | X |
| 169 | | | X | X | X | | | X | X | | | | | X | | |
| 170 | | | X | X | X | | | X | X | | | | | | | X |
| 171 | | | X | X | X | | | | X | | X | X | | | | |
| 172 | | | X | X | X | | | | X | | X | X | | | | X |
| 173 | | | X | X | X | | | | X | | | | X | X | | |
| 174 | | | X | X | X | | | | X | | | | | X | | X |
| 175 | | | X | X | X | | | | | | X | X | | | | X |
| 176 | | | X | X | X | | | | | | | X | X | X | | |
| 177 | | | X | X | X | | | | | | | | X | X | X | |
| 178 | | | X | X | | | X | X | X | X | | | | | | |
| 179 | | | X | X | | | X | X | X | | | | | | X | |
| 180 | | | X | X | | | X | X | | | | | X | X | | |
| 181 | | | X | X | | | X | X | | | | | | X | X | |
| 182 | | | X | X | | | X | X | | | | | | | X | X |
| 183 | | | X | X | | | X | | | | | | X | X | X | |
| 184 | | | X | X | | | | X | X | X | X | | | | | |
| 185 | | | X | X | | | | X | X | X | | | | | | X |
| 186 | | | X | X | | | | X | X | | | | X | X | | |
| 187 | | | X | X | | | | X | X | | | | | X | X | |
| 188 | | | X | X | | | | X | | | | | | X | X | X |
| 189 | | | X | X | | | | | X | X | X | X | | | | |
| 190 | | | X | X | | | | | X | X | | | | | X | X |
| 191 | | | X | X | | | | | | X | X | X | X | | | |
| 192 | | | X | X | | | | | | | | X | X | X | X | |
| 193 | | | X | X | | | | | | | | | X | X | X | X |
| 194 | | | X | | | X | X | X | X | | | | X | | | |
| 195 | | | X | | | X | X | X | X | | | | | | | X |
| 196 | | | X | | | X | X | | | | X | X | X | | | |
| 197 | | | X | | | X | X | | | | | | X | X | X | |
| 198 | | | X | | | | | X | X | X | X | | | X | X | |
| 199 | | | X | | | | | X | X | X | | | | X | X | |
| 200 | | | X | | | | | X | X | X | | | | X | X | |
| 201 | | | X | | | | | X | X | | | | X | X | X | |
| 202 | | | X | | | | | X | | | | X | X | X | X | |
| 203 | | | X | | | | | X | | | | | X | X | X | X |
| 204 | | | X | | | | | | X | X | X | X | | | | X |

TABLE 2-continued

6/18 (d = 3) Code, Pre-Clock Compatible

| | 1 | 2 | 3 | 4 | 5 | 6 | 7 | 8 | 9 | 10 | a | b | c | d | e | f |
|---|---|---|---|---|---|---|---|---|---|---|---|---|---|---|---|---|
| 205 | | | X | | | | | | X | X | | | | X | X | X |
| 206 | | | | X | X | X | X | | | | X | X | | | | |
| 207 | | | | X | X | X | X | | | | X | | | | | X |
| 208 | | | | X | X | X | X | | | | | X | X | | | |
| 209 | | | | X | X | X | X | | | | | | X | X | | |
| 210 | | | | X | X | X | X | | | | | | | X | X | |
| 211 | | | | X | X | X | X | | | | | | | | X | X |
| 212 | | | | X | X | X | | | X | X | | | | X | | |
| 213 | | | | X | X | X | | | X | X | X | | | | | |
| 214 | | | | X | X | X | | | X | | | | | X | X | |
| 215 | | | | X | X | X | | | | | | X | X | X | | |
| 216 | | | | X | X | | X | X | X | X | | | | | | |
| 217 | | | | X | X | | X | X | X | | | | | | | X |
| 218 | | | | X | X | | X | X | | | | | X | X | | |
| 219 | | | | X | X | | X | X | | | | | | X | X | |
| 220 | | | | X | X | | X | | | | | | | X | X | X |
| 221 | | | | X | X | | | X | X | X | X | | | | | |
| 222 | | | | X | X | | | X | X | | | | | X | X | |
| 223 | | | | X | X | | | | X | | | X | X | X | | |
| 224 | | | | X | X | | | | | X | | X | X | X | | |
| 225 | | | | X | X | | | | | | | X | X | X | X | |
| 226 | | | | X | | | X | X | X | X | | | | X | | |
| 227 | | | | X | | | | X | X | | | X | X | X | | |
| 228 | | | | X | | | | X | X | X | | | | X | X | |
| 229 | | | | X | | | | | X | | | | X | X | X | X |
| 230 | | | | | X | X | X | X | | | | X | X | | | |
| 231 | | | | | X | X | X | X | | | | X | X | | | |
| 232 | | | | | X | X | X | X | | | | | X | X | | |
| 233 | | | | | X | X | X | X | | | | | | X | X | |
| 234 | | | | | X | X | X | | | X | X | | | | | |
| 235 | | | | | X | X | X | | | | X | X | X | | | |
| 236 | | | | | X | X | X | | | | | | | X | X | X |
| 237 | | | | | X | X | | X | X | X | X | | | | | |
| 238 | | | | | X | X | | X | X | | | | | X | X | |
| 239 | | | | | X | X | | | X | | | X | X | X | | |
| 240 | | | | | X | X | | | | X | | X | X | X | | |
| 241 | | | | | X | X | | | | | | X | X | X | X | |
| 242 | | | | | X | | | X | X | X | X | | | | | X |
| 243 | | | | | X | | | X | X | | | | | X | X | |
| 244 | | | | | | X | X | X | X | | | | X | X | | |
| 245 | | | | | | X | X | X | X | | | | | X | X | |
| 246 | | | | | | X | X | X | X | | | | | X | X | X |
| 247 | | | | | | X | X | X | | | | | X | X | X | |
| 248 | | | | | | X | X | | | X | X | X | X | | | |
| 249 | | | | | | X | X | | | | X | X | X | X | | |
| 250 | | | | | | X | X | | | | | X | X | X | X | |
| 251 | | | | | | | X | X | X | X | | | X | X | | |
| 252 | | | | | | | X | X | X | X | | | | X | X | |
| 253 | | | | | | | X | X | X | | | | X | X | X | |
| 254 | | | | | | | X | X | | | X | X | X | | | |
| 255 | | | | | | | X | X | | | | | X | X | X | X |

Figure 11:
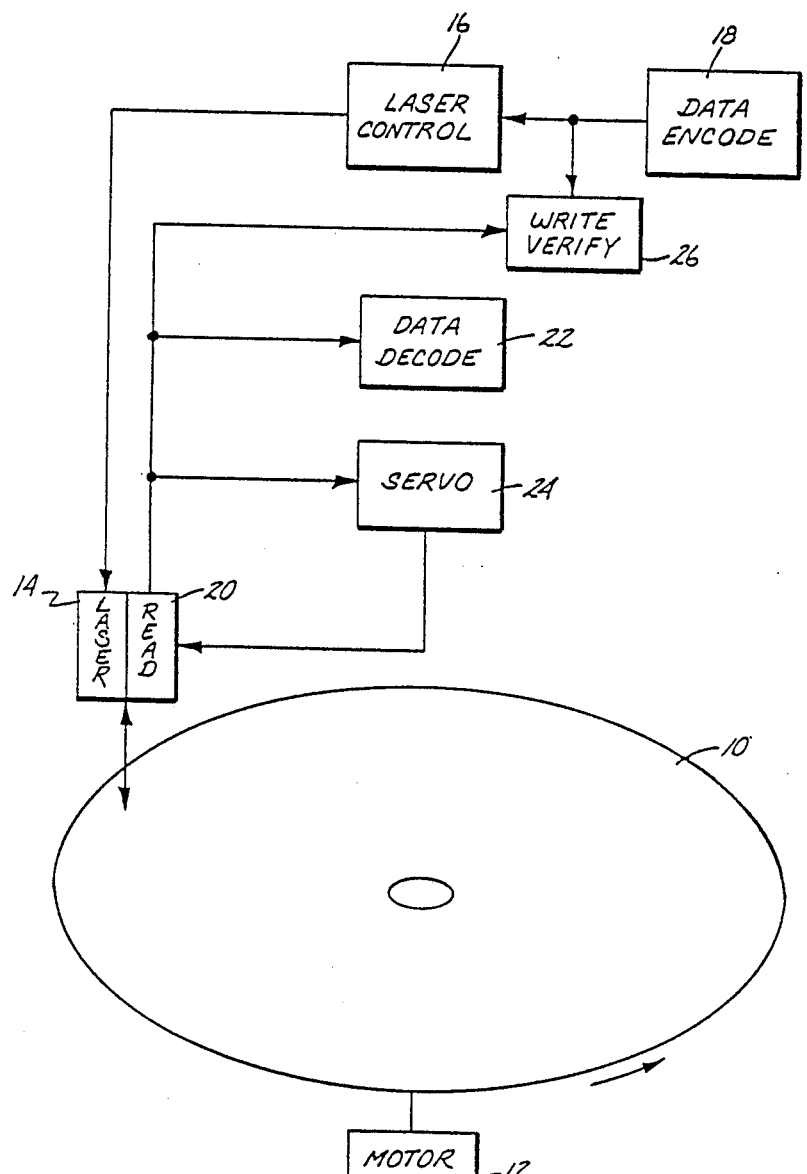
FIG. 11 is a block diagram of optical recording apparatus for implementing the code of the preferred embodiment.

Apparatus for implementing applicant's invention is shown in FIG. 11. Laser disk 10 comprises a disk of optically reflective material in which holes may be burned to reduce the reflectivity of the surface at the hole. The disk 10 is typically composed of grooves (not shown) stamped in a substrate by a replication process. The grooves are depth modulated with a clock frequency. Thereafter, the surface of the substrate is coated with an optically reflective material suitable for recording data thereon in the forms of holes according to the present invention. Motor 12 rotates disk 10 both during recording of data and during reading of data. Laser 14 is used both to record data and to read data. In a recording mode, the laser is operated at a higher power than when reading data. The power is at a level such that it burns a hole in the reflective material of the disk 10. In this regard, to write a hole, the laser itself, which may be comprised of a laser diode, may be pulsed or the beam of the laser, such as from a gas laser, may be deflected away from the optical disk 10. In the reading mode, the laser operates continuously at less power, insufficient to alter the reflective nature of the optical disk 10. The laser is under the control of a laser control 16. Control 16 controls the laser's power level and its pulsation or beam deflection. The data to be written comes from data encode 18. Data encode 18 receives binary data to be written on optical disk 10, encodes it according to the present invention in a 4 out of 15 or 6 out of 18 code, transmits the encoded data to laser control 16, which in turn controls laser 14 to write the data on the rotating optical disk 10.

Whether in a write mode or a read mode, read means 20 detects the reflection of the laser beam from the optical disk 10. Means for detection are conventionally a photodiode, which converts light into electrical signals. The output of the read means 20 is provided to a servo means 24, which maintains the position of the laser and read apparatus 14 and 20 directly above a track on optical disk 10. The output of the read apparatus 20 is also supplied to data decode 22 and to a read-after-write verify circuit 26. The read-after-write verify circuit 26 compares the data written on a disk with the data read from a disk during write to verify that the data has been correctly written on the disk 10. If the data has been incorrectly written on the disk 10, a rewrite may be initiated or error correction means may be employed. In the read mode, the data provided to data decode is decoded from the TOON, the 4 out of 15 or 6 out of 18 code to the binary code of the original data. In the preferred embodiment, error correction (not shown) is performed on 8 bit binary data.

A second preferred 4/15 code is shown below. This code is designed to be used in conjunction with the decode electronics shown in FIGS. 12 and 13. The code breaks the fourteen positions where holes may occur into two sets, even and odd, because the code must have two even and two odd holes. Each set is then encoded or decoded separately with greatly reduced logic vis-a-vis decoding 14 positions. Further, each set is is constructed identically. This structure permits direct conversion between binary hex digits and code sets. That is, eight binary bits are interpreted as two digits of four which may be represented symbolically as two hex digits. Each digit is encoded or decoded separately and corresponds to the even or odd set of the 4/15 code. In the preferred embodiment, the first four bits or hex digit corresponds to the odd set of the 4/15 code, while the second four bits or hex digit corresponds to the even set of the 4/15 code.

The actual code structure is as follows:

ODD SET

| FIRST DIGIT | \multicolumn{7}{c}{HOLE POSITIONS} |
|---|---|---|---|---|---|---|---|
| | 1 | 3 | 5 | 7 | 9 | 11 | 13 |
| 0 | X | | X | | | | |
| 1 | X | | | X | | | |
| 2 | X | | | | X | | |
| 3 | X | | | | | X | |
| 4 | X | | | | | | X |
| 5 | | X | | X | | | |
| 6 | | X | | | X | | |
| 7 | | X | | | | X | |
| 8 | | X | | | | | X |
| 9 | | | X | | X | | |
| A | | | X | | | X | |
| B | | | X | | | | X |
| C | | | | X | | X | |
| D | | | | X | | | X |
| E | | | | | X | | X |

$$F = \begin{bmatrix} X & X & & & & & \\ & X & X & & & & \\ & & X & X & & & \\ & & & X & X & & \\ & & & & X & X & \\ & & & & & X & X \end{bmatrix}$$

EVEN SET

| FIRST DIGIT | \multicolumn{6}{c}{HOLE POSITIONS} |
|---|---|---|---|---|---|---|
| | 2 | 4 | 6 | 8 | 10 | 12 | 14 |
| 0 | X | | X | | | | |
| 1 | X | | | X | | | |
| 2 | X | | | | X | | |
| 3 | X | | | | | X | |
| 4 | X | | | | | | X |
| 5 | | X | | X | | | |
| 6 | | X | | | X | | |
| 7 | | X | | | | X | |
| 8 | | X | | | | | X |
| 9 | | | X | | X | | |
| A | | | X | | | X | |
| B | | | X | | | | X |
| C | | | | X | | X | |
| D | | | | X | | | X |
| E | | | | | X | | X |

$$F = \begin{bmatrix} X & X & & & & & \\ & X & X & & & & \\ & & X & X & & & \\ & & & X & X & & \\ & & & & X & X & \\ & & & & & X & X \end{bmatrix}$$

The symbols for F for each set depend upon the state of the other set and are chosen such that when combined with the holes of the other set three holes occur in a row. For example:

| 1st DIG. | 2nd DIG. | \multicolumn{14}{c}{HOLE POSITIONS} |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| 0 | F | X | | | X | X | X | | | | | | | | |
| 5 | F | | | X | | | X | X | X | | | | | | |
| F | 0 | | X | | | X | X | X | | | | | | | |
| F | 3 | X | X | X | | | | | | | | | X | | |

The symbol for F F is defined to be

| 1st DIG. | 2nd DIG. | \multicolumn{14}{c}{HOLE POSITIONS} |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| F | F | | | | | | | X | X | X | X | | | | |

The above code defines all possible combinations of 8 binary bits, however it does not exhaust all permissible combinations for the 4/15 code. Remaining combinations may be used for special functions or for synchronizations. The encoder and decoder may signal a special function by the use of a flag:

| FLAG | 1st | 2nd | \multicolumn{14}{c}{HOLE POSITIONS} |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| M | 5 | F | | X | X | X | | | X | | | | | | | |
| M | 6 | F | | X | X | X | | | | X | | | | | | |
| M | 7 | F | | X | X | X | | | | | | | X | | | |
| M | 8 | F | | X | X | X | | | | | | | | | X | |
| M | F | 3 | | X | | | | | | | | | | X | X | X |
| M | F | 7 | | | | | X | | | | | | | X | X | X |
| M | F | A | | | | | | | X | | | | | X | X | X |
| M | F | C | | | | | | | | | X | | | X | X | X |
| M | 0 | 0 | X | X | X | X | | | | | | | | | | |
| M | 1 | 1 | | X | X | X | X | | | | | | | | | |
| M | 2 | 2 | | | X | X | X | X | | | | | | | | |
| M | 3 | 3 | | | | X | X | X | X | | | | | | | |
| M | 4 | 4 | | | | | X | X | X | X | | | | | | |
| M | 5 | 5 | | | | | | X | X | X | X | | | | | |

-continued

| FLAG | 1st | 2nd | 1 | 2 | 3 | 4 | 5 | 6 | 7 | 8 | 9 | 10 | 11 | 12 | 13 | 14 |
|------|-----|-----|---|---|---|---|---|---|---|---|---|----|----|----|----|----|
| | | | | | | | | | | | HOLE POSITIONS | | | | | |
| M | 6 | 6 | | | | | | | | X | X | X | X | | | |
| M | 7 | 7 | | | | | | | | | X | X | X | X | | |
| M | 8 | 8 | | | | | | | | | | X | X | X | X | |
| M | 9 | 9 | | | | | | | | | | | X | X | X | X |

Figure 12A:
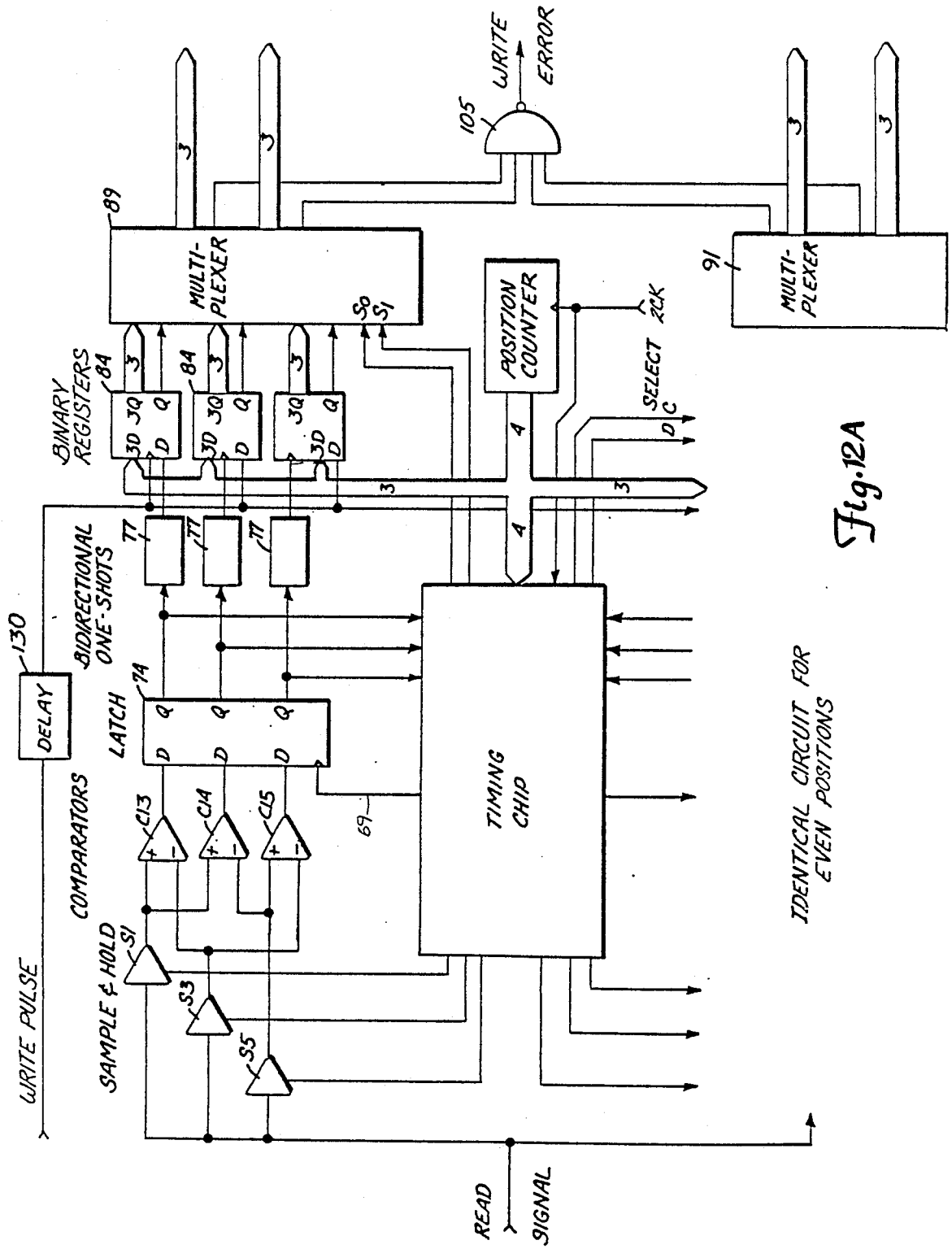
FIGS. 12(a) and (b) show a rough schematic of a circuit which may read and decode the 4/15 code from an optical disk.
Figure 12B:
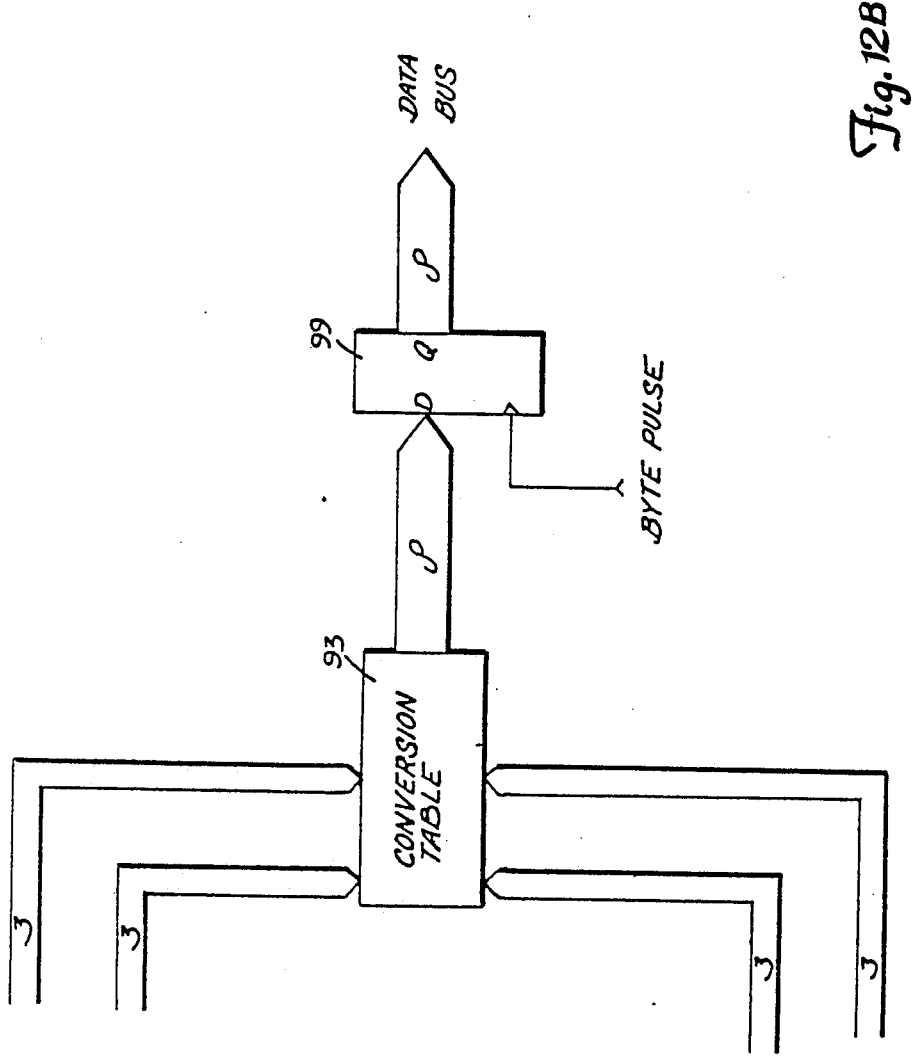

Apparatus for reading the 4/15 code from the optical disk is disclosed in copending application Ser. No. 578,151 filed 2/8/84, which applicants hereby incorporate by reference. Such apparatus returns the location of the holes as three digit addresses, the even and odd set of holes being treated separately. Thus the even set of symbol positions is comprised of the set 2,4,6,8,10,12,14 and the odd positions the set 1,3,5,7,9,11,13. An even address of 3 states that a hole occurs at symbol position 8, etc. Because four holes occur in a symbol, two each for the even and odd sets, the read electronics returns two addresses for each set. As disclosed in that application, the addresses for each set are input to a single ROM, which outputs an eight bit (nine bit if the flag is used) binary byte. Note that as each "F" digit state depends upon the state of the other digit, as a practical matter all four three-bit address must be analyzed simultaneously to properly decode the 4/15 code above disclosed. This requires a single 4096×8 (or 9) ROM. FIG. 12 show such a configuration. FIG. 12 is actually FIG. 6 of the above-identified application.

Figure 13:
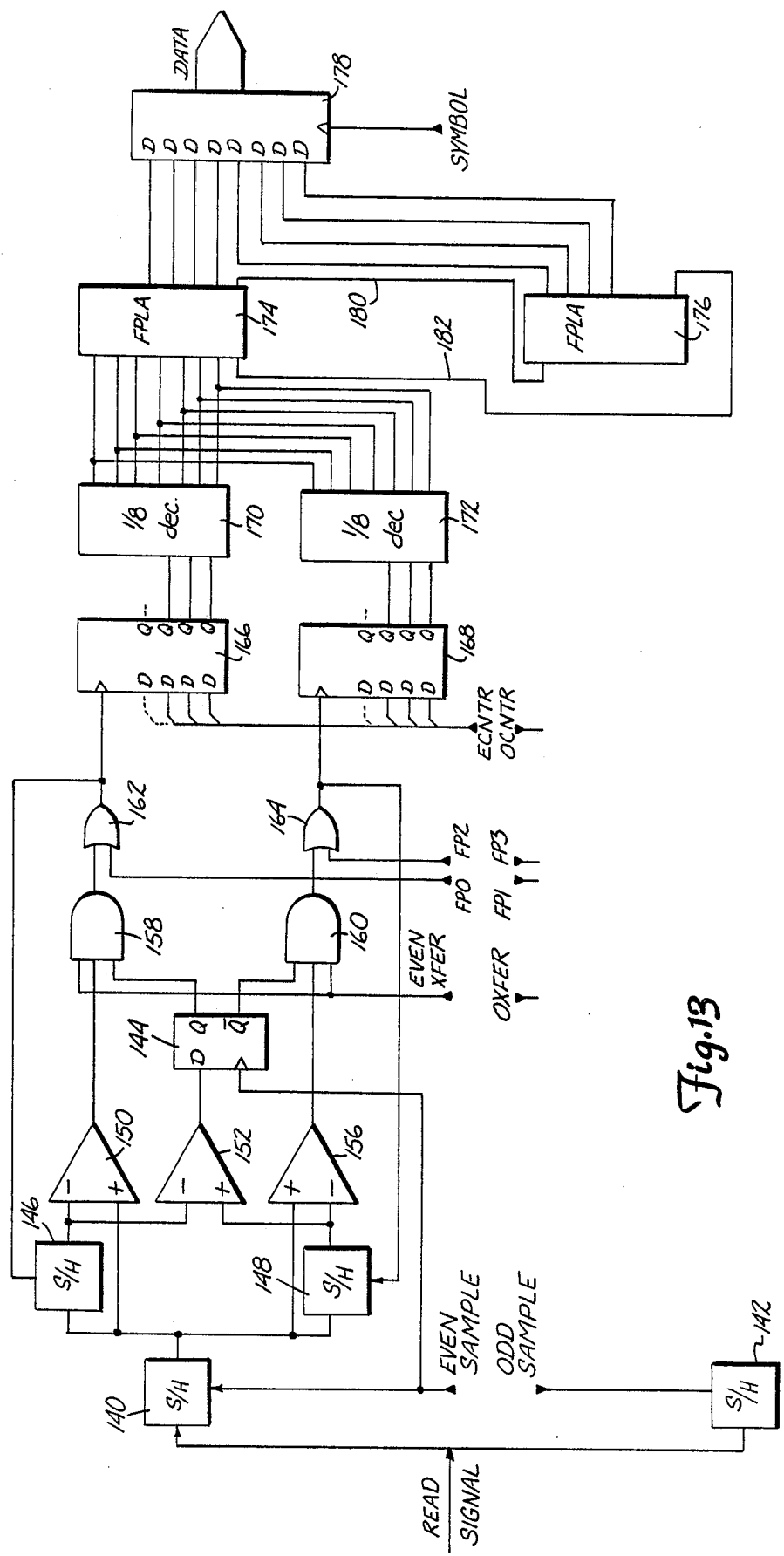
FIG. 13 shows a rough schematic of an alternate circuit which may read and decode the 4/15 code from an optical disk.
Figure 14:
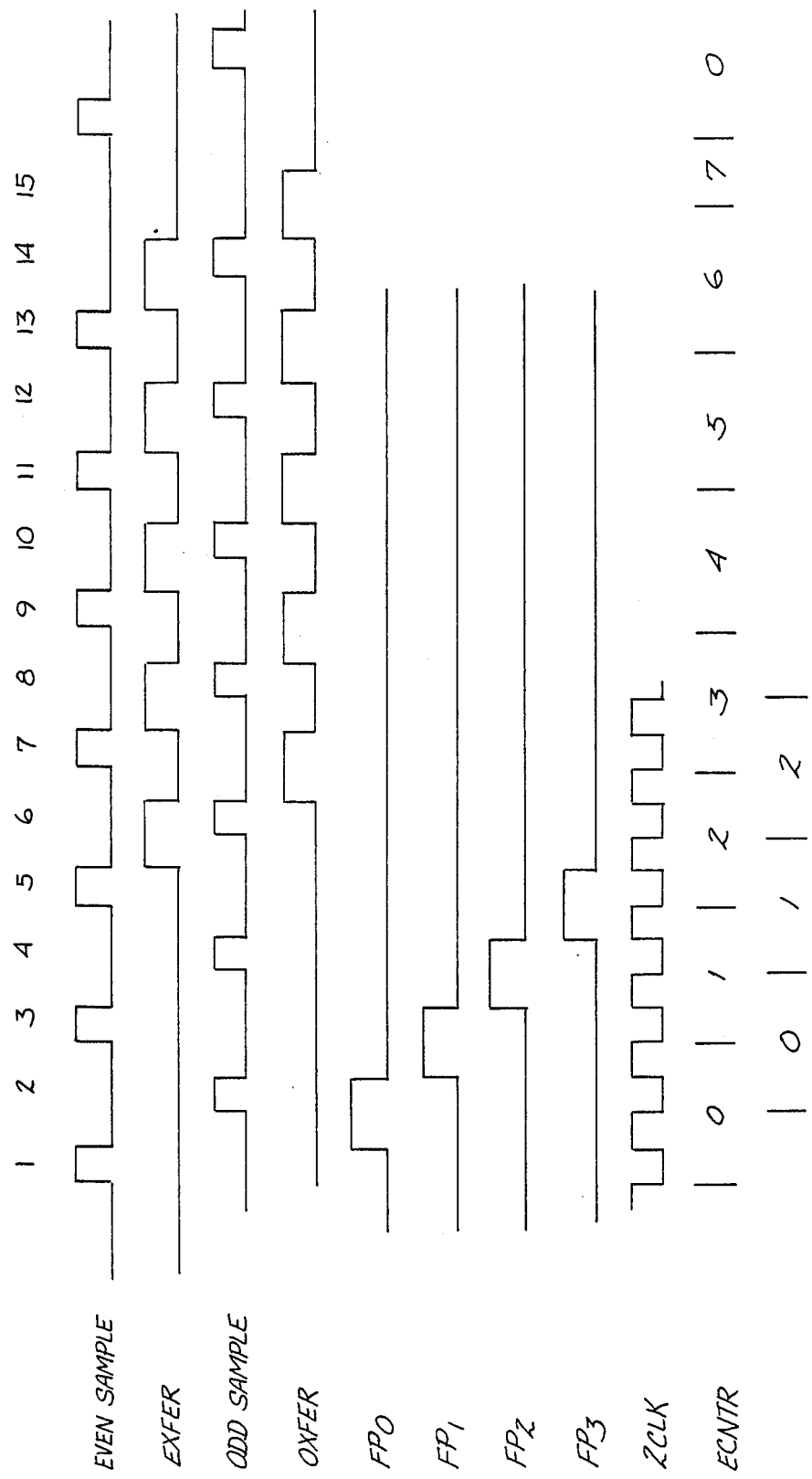
FIG. 14 shows a timing diagram for use in conjunction with the circuit of FIG. 13.

An alternative approach to decoding the 4/15 code is disclosed in FIGS. 13 and 14. FIG. 13 shows a rough schematic of the circuits which may read and decode the 4/15 code from an optical disk and FIG. 14 shows a timing diagram for use in conjunction therewith. The timing signals shown in the Figures may be provided by a Timing Chip such as shown in FIG. 12.

Briefly the circuit functions as follows: The odd and even symbol positions are decoded separately. The read signal from a preamplifier (not shown) is input (Read Signal input) to sample and holds for the even 140 and odd 142 symbol positions respectively. The Odd Circuit (see Figure) is not shown in detail. It is an exact duplicate of the Even Circuit. The Odd Circuit timing details are shown in FIG. 14, and except for a one position offset, they are exactly the same as the read timing signals. Therefore, the discussion to follow is fully applicable to the odd symbol position circuit.

The 4/15 symbol has fifteen positions as shown in the timing diagram. At symbol position 1 (which in the lexicon used herein is an "even" symbol position) as Even Sample signal triggers an even sample and hold 140 to copy the signal present on the Read Signal input. It triggers a flip flop 144, which then copies the state of comparator 152 (the state of which at this time is indeterminate).

At symbol position 2, the Timing Chip provides a signal $FP_0$ to an OR gate 162. This signal causes register 166 to copy the state of a counter shown figuratively as ECNTR in the figures. The count varies from 0 to 7, incrementing by one every other symbol position. See the timing diagram. The state of the counter at this time is 0, and this is what register 166 copies.

The triggering of OR gate 162 also triggers sample and hold 146 to copy the state of sample and hold 140. At this juncture, the level of sample and hold 146 should be higher than the other two sample and holds.

At symbol position 3, the Even Sample signal again triggers sample and hold 140 and flip flop 144. Sample and hold 146 remains greater than 148, and flip flop 144 remains or goes to a zero state.

At symbol position 4, the Timing Chip outputs a signal $FP_2$ which triggers OR gate 164, register 168 and sample and hold 148. The address copied into register 168 is the address 1. The Sample and hold 148 level may or may not be greater than sample and hold 146 level at this time. This depends upon whether or not holes were present at these positions and the strength of the signals caused by the holes. However, both would contain signal levels greater than the signal level in sample and hold 140.

At symbol position 5 the Even Sample signal again triggers sample and hold 140 and also triggers flip flop 144 to copy the state of comparator 152 which reflects the state of sample and holds 146 and 148. If the former's signal level is less than the latter's, the flip flop sets to a 1, while if the opposite is the case, it will remain a 0.

At symbol position 6, the Timing Chip issues an Even Xfer signal which is input to AND gates 158 and 160. The other inputs to AND gate 158 are the Q output of flip flop 144 and the output of a comparator 150, which determines whether the signal in sample and hold 140 is greater than the signal in sample and hold 146. If it is, and the signal in sample and hold 148 is greater than the signal in sample and hold 146 (the Q output is high) then all inputs to the AND gate 158 are high and its output goes high. This essentially means that a new, higher-valued signal has been found vis-a-vis sample and hold 146. OR gate 162 now goes high triggering register 166 to copy the address of the higher-valued signal and triggering sample and hold 146 to copy its signal from sample and hold 140. The signal is copied into sample and hold 146 rather than 148 because the signal in 146 was lower than the signal in 148.

If the opposite is the case, the Q NOT output of flip flop 144 would be high. This output is provided to AND gate 160. If the value of the new signal in sample and hold 140 is also greater than the value of the signal in sample and hold 148 as reflected by the output of comparator 156, which is the final input to AND gate 160, then the Even Xfer signal causes the AND and the OR gate 164 to go high, which then causes the register 168 to copy the address of the new higher-valued signal and also causes sample and hold 148 to copy the higher-valued signal from sample and hold 140.

This process continues for the rest of the symbol, except for position 15 which is constrained to never have a hole recorded therein. Every time the new signal recorded in sample and hold 140 exceeds the lower-valued signal of either sample and hold 146 or 148, the signal is copied into this lower-valued signal sample and hold and the address where the new higher-valued signal occurred is recorded in register 166 or 168. At the end of the symbol, registers 166 and 168 have recorded in them the addresses of the two highest valued "even"

signal. These are presumptively the addresses of the holes.

These addresses are converted to the actual hole location in a representative symbol by ½ decoders 170 and 172, the outputs of which are combined and input to a commercially available field programmable logic array (FPLA) 174 which converts the input pattern of two-out-of-seven to a four-bit pattern.

"F" codes are recognized by noting that all codes other than F have at least a distance of 2 between addresses while F alone has a distance of one. If the special function codes are eliminated from the code possibilities, no connections are needed between the FPLA's to signal the decoding of such. However, if special functions are to be included, the pressure of an F in one of the two FPLA's 174 must be communicated to the other to correctly decode the other's two-out-of-seven inputs into its four bit output. These feedbacks are shown as lines 180 and 182 in the figure.

At the end of a symbol, the Timing Chip signals such via a signal Symbol, which triggers register 178 to copy the two sets of four-bit outputs from the even (174) and odd (178) FPLA's respectively. The register's eight outputs are then provided to a data channel.

In summary, the first code of applicants' invention comprises the TOON code. The second comprises the 4115 code which is a symbol having 15 positions, equally spaced within a symbol, for encoding 8 bits of binary data. Holes are written centered on a symbol and may have diameters larger than the symbol position spacing. Exactly four holes, and only four holes, appear within each symbol. For each hole appearing in an even position, there appears a hole in an odd position, and vise versa. This generates a null in the frequency spectrum so the prerecorded clock signal can be read and decoded by other electronics not shown. The 15th position never has a hole. At least two symbol positions appear between monoholes or between monoholes and groups of holes or between groups of holes.

While not essential to the invention, the following constraints have been further applied to reduce the number of codes from 441 to 256. All symbols having four consecutive holes have been eliminated. All symbols having three holes in symbol positions, 1, 2 and 3, in positions 2, 3 and 4, or in position 12, 13 and 14 have been eliminated.

Applicants' 6 out of 18 code is constructed similarly with D=3 and two empty spaces at the end of each symbol (two empty spaces between symbols). Symbols having five and six holes in a row as well as four in a row at position 1-4 have been eliminated.

The specification of the elements of the preferred embodiment should not be taken as a limitation on the scope of the appended claims in which I claim:

1. Optical recording and reading apparatus for recording and reading a high density code comprising:
    optical disk means;
    means for moving said disk;
    laser means for directing a laser beam onto said disk;
    means for controlling said laser beam;
    means for optically detecting said laser beam after having impinged upon said disk;
    means for encoding data into a predetermined format; said means for controlling said laser means being responsive to said means for encoding for recording said encoded data onto said disk by burning holes into said disk according to said predetermined format;
    means, responsive to said means for detecting said laser beam, for decoding said encoded data;
    said predetermined format comprising:
    a symbol having fifteen sequential positions equally spaced within the symbol, said symbol positions comprising the sequential locations on the disk where a hole may to be burned into the optical disk by said laser means, each burned hole having a diameter equal to or greater than the length of a symbol position on said optical disk;
    each symbol having exactly four holes and only four holes;
    each symbol having two holes in even positions;
    each symbol having two holes in odd positions;
    each symbol having no holes in the fifteenth position;
    each symbol having at least two symbol positions between monoholes or between monoholes and groups of holes or between groups of holes;
    wherein a monohole comprises a hole at a symbol position with the absence of hole at adjacent positions, and a group of holes comprises more than one hole in adjacent positions.

2. The optical recording and reading apparatus of claim 1 further including
    each symbol never having four consecutive holes.

3. The optical recording and reading apparatus of claim 2 further including
    each symbol never having groups of three holes recorded in symbol positions 1, 2 and 3, in positions 2, 3 and 4 or in positions 12, 13 and 14.

4. The optical recording and reading apparatus of claim 1 further including
    each symbol never having groups of three holes recorded in symbol positions 1, 2 and 3, in positions 2, 3 and 4 or in positions 12, 13 and 14.

5. Optical recording and reading apparatus for recording and reading a high density code comprising:
    optical disk means;
    means for moving said disk;
    laser means for directing a laser beam onto said disk;
    means for controlling said laser beam;
    means for optically detecting said laser beam after having impinged upon said disk;
    means for encoding data into a predetermined format; said means for controlling said laser means being responsive to said means for encoding for recording said encoded data onto said disk by burning holes into said disk according to said predetermined format;
    means, responsive to said means for detecting said laser beam, for decoding said encoded data;
    said predetermined format comprising:
    a symbol having eighteen sequential positions equally spaced within the symbol, said symbol positions comprising the sequential locations on the disk where a hole may to be burned into the optical disk by said laser means, each burned hole having a diameter equal to or greater than the length of a symbol position on said optical disk;
    each symbol having exactly six holes and only six holes;
    each symbol having three holes in even positions;
    each symbol having three holes in odd positions;
    each symbol having no holes in the seventeenth and eighteenth positions;
    each symbol having at least three symbol positions between monoholes or between monoholes and groups of holes or between groups of holes;

wherein a monohole comprises a hole at a symbol position with the absence of hole at adjacent positions, and a group of holes comprises more than one hole in adjacent positions.

6. The optical recording and reading apparatus of claim 5 further including
each symbol never having five or six consecutive holes.

7. The optical recording and reading apparatus of claim 6 further including
each symbol never having groups of four holes recorded at symbol positions 1, 2, 3 and 4.

8. The optical recording and reading apparatus of claim 7 further including
each symbol never having groups of four holes recorded at symbol positions 1, 2, 3 and 4.

9. A system for recording and reading a plurality of symbols in coded form from a record carrier, comprising:
a record carrier adapted for having two media states, an unaltered state and an altered state;
means for inducing and sensing a signal responsive to said media states, the signal strength varying according to the media state, and being stronger for said altered state, and further varying to a degree according to the length of the altered state, the longer the altered state, the stronger the signal;
information recorded on said record carrier in the form of altered media states, a hole comprising an altered media state of a predetermined length, a monohole comprising a hole having unaltered media states before and after the altered state of a single hole, a group of holes comprising a plurality of adjacent holes with substantially no unaltered media states between adjacent holes and unaltered media states before and after the group of holes;
said information further recorded on said record carrier with a spacing between groups of holes and other groups of holes or monoholes such that the signal strength read at a point midway between the group of holes and the other groups of holes or monoholes is less than the maximum signal strength caused by a monohole;
said information recorded on said record carrier further comprising a fixed block code for coding said plurality of symbols wherein the fixed block code for each of said plurality of symbols has fewer altered states than unaltered states and wherein the code for at least one of said plurality of symbols contains at least one group of adjacent holes with substantially no unaltered media states between said adjacent holes, and with unaltered media states before and after said group of adjacent holes.

10. A system as claimed in claim 9 wherein said fixed block code further comprises:
a symbol having a predetermined number of positions;
each symbol having a predetermined number of holes;
each symbol having a first predetermined number of symbol positions between monoholes or between monoholes and groups of holes or between groups of holes;
each symbol having a second predetermined number of empty symbol positions at the boundary of the symbol, said second predetermined number being one less than said first predetermined number.

11. A system according to claim 10 for recording and reading coded binary data on an optical recording media of a type in which holes are made in the media to represent one state and the absence of a hole represents the complementary state and further of a type having a null in the frequency spectrum upon recording or reading whereby the optical media may include a prerecorded clock signal for assisting in the writing and reading of the data, comprising:
a symbol having nine positions equally spaced within the symbol for encoding eight binary bits of data;
a constraint that exactly two holes and only two holes appear within each symbol;
a constraint that for each hole appearing in an even position, there appear a hole at an odd position;
a constraint that the ninth position never have a hole;
a constraint that at least two positions appear between monoholes or between monoholes and groups of holes or between groups of holes.

12. A system according to claim 10 for recording and reading coded binary data on an optical recording media of a type in which holes are made in the media to represent one state and the absence of a hole represents the complementary state and further of a type having a null in the frequency spectrum upon recording or reading whereby the optical media may include a prerecorded clock signal for assisting in the writing and reading of the data, comprising:
a symbol having nine sequential positions equally spaced within the symbol, said symbol positions comprising the sequential locations on the disk where a hole may to be burned into the optical disk by said laser means, each burned hole being centered on a symbol position on said optical disk;
each symbol having exactly two holes and only two holes;
each symbol having one hole in even positions;
each symbol having one hole in odd positions;
each symbol having no holes in the ninth position;
each symbol having at least two symbol positions between monoholes or between monoholes and groups of holes or between groups of holes;
wherein a monohole comprises a hole at a symbol position with the absence of hole at adjacent positions, and a group of holes comprises more than one hole in adjacent positions.

13. A system according to claim 10 for recording and reading coded binary data on an optical recording media of a type in which holes are made in the media to represent one state and the absence of a hole represents the complementary state and further of a type having a null in the frequency spectrum upon recording or reading whereby the optical media may include a prerecorded clock signal for assisting in the writing and reading of the data, comprising:
a symbol having fifteen positions equally spaced within the symbol for encoding eight binary bits of data;
a constraint that exactly four holes and only four holes appear within each symbol;
a constraint that for each hole appearing in an even position, there appear a hole at an odd position;
a constraint that the fifteenth position never have a hole;
a constraint that at least two positions appear between monoholes or between monoholes and groups of holes or between groups of holes.

14. The system of claim 13 further including a constraint that four holes never be consecutively recorded.

15. The system of claim 14 further including
a constraint that groups of three holes not be recorded in positions 1, 2 and 3, in positions 2, 3 and 4 or in positions 12, 13 and 14.

16. The system of claim 13 further including
a constraint that groups of three holes not be recorded in positions 1, 2 and 3, in positions 2, 3 and 4 or in positions 12, 13 and 14.

17. The high density code of claim 13 wherein
the fourteen positions of the code wherein holes may occur comprise two sets of positions, an even set comprising the even numbered positions and an odd set comprising the odd numbered positions; and further,
the even set encodes an even digit of four binary bits; and
the odd group encodes a odd digit of four binary bits.

18. The high density code of claim 17 wherein the even and odd code conversions between digits and code is identical.

19. The high density code of claim 17 wherein each of said plurality of symbols is representable by a number comprising first and second digits and wherein the code conversion for a first predetermined value of said first digit depends upon the state of said second digit.

20. The high density code of claim 19 further including a plurality of special function code conversions from said even and odd digits signaled by a flag.

21. A system according to claim 10 for recording and reading binary data on an optical recording media of a type in which holes are made in the media to represent one state and the absence of a hole represents the complementary state and further of a type having a null in the frequency spectrum upon recording or reading whereby the optical media may include a prerecorded clock signal for assisting in the writing and reading of the data, comprising:
a symbol having eighteen positions equally spaced within the symbol for encoding eight binary bits of data;
a constraint that exactly six holes and only six holes appear within each symbol;
a constraint that for each hole appearing in an even position, there appear a hole at an odd position;
a constraint that the seventeenth and eighteenth positions never have a hole;
a constraint that at least three positions appear between monoholes or between monoholes and groups of holes or between groups of holes.

22. The system of claim 21 further including
a constraint that five or six holes never be consecutively recorded.

23. The system of claim 22 further including
a constraint that groups of four holes not be recorded at positions 1, 2, 3 and 4.

24. The system of claim 21 further including
a constraint that groups of four holes not be recorded in at positions 1, 2, 3 and 4.

25. A system for recording and reading a plurality of symbols in coded form from a record carrier, comprising:
a record carrier adapted for having two media states, an unaltered state and an altered state;
means for inducing and sensing a signal responsive to said media states, the signal strength varying according to the media state, and being stronger for said altered state, and further varying to a degree according to the length of the altered state, the longer the altered state, the stronger the signal;
information recorded on said record carrier in the form of altered media states, a hole comprising an altered media state of a predetermined length, a monohole comprising a hole having unaltered media states before and after the altered state of a single hole, a group of holes comprising a plurality of adjacent holes with substantially no unaltered media states between adjacent holes and unaltered media states before and after the group of holes;
said information further recorded on said record carrier with a spacing between groups of holes and other groups of holes or monoholes such that the signal strength read at a point midway between the group of holes and the other groups of holes or monoholes is less than the maximum signal strength caused by a monohole;
said information recorded on said record carrier further comprising a fixed code for coding said plurality of symbols wherein the fixed block code for each of said plurality of symbols is recorded on said record carrier at a sequence of symbol positions comprising a first position, a last position and a plurality of interior positions, and wherein said code for at least one of said plurality of symbols has at least one monohole at one of said interior positions.

26. A system as claimed in claim 25 wherein said fixed block code further comprises:
a symbol having a predetermined number of positions;
each symbol having a predetermined number of holes;
each symbol having a first predetermined number of symbol positions between monoholes or between monoholes and groups of holes or between groups of holes;
each symbol having a second predetermined number of empty symbol positions at the boundary of the symbol, said second predetermined number being one less than said first predetermined number.

27. A fixed block code as claimed in claim 25 for recording and reading coded binary data on an optical recording media of a type in which holes are made in the media to represent one state and the absence of a hole represents the complementary state and further of a type having a null in the frequency spectrum upon recording or reading whereby the optical media may include a prerecorded clock signal for assisting in the writing and reading of the data, comprising:
a symbol having nine positions equally spaced within the symbol for encoding eight binary bits of data;
a constraint that exactly two holes and only two holes appear within each symbol;
a constraint that for each hole appearing in an even position, there appear a hole at an odd position;
a constraint that the ninth position never have a hole;
a constraint that at least two positions appear between monoholes or between monoholes and groups of holes or between groups of holes.

28. A fixed block code as claimed in claim 25 for recording and reading coded binary data on an optical recording media of a type in which holes are made in the media to represent one state and the absence of a hole represents the complementary state and further of a type having a null in the frequency spectrum upon recording or reading whereby the optical media may include a prerecorded clock signal for assisting in the writing and reading of the data, comprising:

- a symbol having fifteen positions equally spaced within the symbol for encoding eight binary bits of data;
- a constraint that exactly four holes and only four holes appear within each symbol;
- a constraint that for each hole appearing in an even position, there appear a hole at an odd position;
- a constraint that the fifteenth position never have a hole; and
- a constraint that at least two positions appear between monoholes or between monoholes and groups of holes or between groups of holes.

29. Optical recording and reading apparatus for recording and reading a fixed block code as claimed in claim 25, comprising:

- optical disk means;
- means for moving said disk;
- laser means for directing a laser beam onto said disk;
- means for controlling said laser beam;
- means for optically detecting said laser beam after having impinged upon said disk;
- means for encoding data into a predetermined format;
- said means for controlling said laser means being responsive to said means for encoding for recording said encoded data onto said disk by burning holes into said disk according to said predetermined format;
- means, responsive to said means for detecting said laser beam, for decoding said encoded data;
- said predetermined format comprising:
- a symbol having eighteen sequential positions equally spaced within the symbol, said symbol positions comprising the sequential locations on the disk where a hole may to be burned into the optical disk by said laser means, each burned hole having a diameter equal to or greater than the length of a symbol position on said optical disk;
- each symbol having exactly six holes and only six holes;
- each symbol having three holes in even positions;
- each symbol having three holes in odd positions;
- each symbol having no holes in the seventeenth and eighteenth positions;
- each symbol having at least three symbol positions between monoholes or between monoholes and groups of holes or between groups of holes, wherein a monohole comprises a hole at a symbol position with the absence of hole at adjacent positions, and a group of holes comprises more than one hole in adjacent positions.

* * * * *